(12) United States Patent
Ben Or et al.

(10) Patent No.: US 9,389,892 B2
(45) Date of Patent: Jul. 12, 2016

(54) MULTIPLE POINTS IN TIME DISK IMAGES FOR DISASTER RECOVERY

(75) Inventors: Tomer Ben Or, Givat Haim Ichud (IL); Gil Barash, Tel Aviv (IL); Chen Burshan, Tel Aviv (IL)

(73) Assignee: ZERTO LTD., Herzilya (IL)

( * ) Notice: Subject to any disclaimer, the term of this patent is extended or adjusted under 35 U.S.C. 154(b) by 1075 days.

(21) Appl. No.: 13/367,456

(22) Filed: Feb. 7, 2012

(65) Prior Publication Data

US 2012/0151273 A1    Jun. 14, 2012

Related U.S. Application Data

(63) Continuation-in-part of application No. 13/175,898, filed on Jul. 4, 2011, which is a continuation-in-part of application No. 13/039,446, filed on Mar. 3, 2011.

(60) Provisional application No. 61/314,589, filed on Mar. 17, 2010.

(51) Int. Cl.
G06F 15/173    (2006.01)
G06F 9/455    (2006.01)

(52) U.S. Cl.
CPC .. G06F 9/45533 (2013.01); *G06F 2009/45579* (2013.01)

(58) Field of Classification Search
None
See application file for complete search history.

(56) References Cited

U.S. PATENT DOCUMENTS

| 5,212,784 A | 5/1993 | Sparks |
| 5,544,347 A | 8/1996 | Yanai et al. |
| 5,649,152 A | 7/1997 | Ohran et al. |
| 5,664,186 A | 9/1997 | Bennett et al. |
| 5,835,953 A | 11/1998 | Ohran |

(Continued)

FOREIGN PATENT DOCUMENTS

WO    2009151445 A1    12/2009

OTHER PUBLICATIONS

Notification Concerning Transmittal of International Preliminary Report on Patentability dated Jan. 7, 2014 in corresponding PCT Application No. PCT/IL2012/000271, 12 pages.

(Continued)

*Primary Examiner* — Scott B Christensen
*Assistant Examiner* — Thomas Richardson
(74) *Attorney, Agent, or Firm* — Foley & Lardner LLP; James C. De Vellis

(57) ABSTRACT

An enterprise disaster recovery system, including a processor for running at least one data application that reads data from at least one data disk and writes data to the at least one data disk over a period of time, a recovery test engine that (i) generates in parallel a plurality of processing stacks corresponding to a respective plurality of previous points in time, each stack operative to process a command to read data at a designated address from a designated data disk and return data at the designated address in an image of the designated data disk at the previous point in time corresponding to the stack, and (ii) that generates in parallel a plurality of logs of commands issued by the at least one data application to write data into designated addresses of designated data disks, each log corresponding to a respective previous point in time.

16 Claims, 20 Drawing Sheets

(56) References Cited

U.S. PATENT DOCUMENTS

| | | | |
|---|---|---|---|
| 5,933,653 | A | 8/1999 | Ofek |
| 5,935,260 | A | 8/1999 | Ofer |
| 5,991,813 | A | 11/1999 | Zarrow |
| 6,073,209 | A | 6/2000 | Bergsten |
| 6,073,222 | A | 6/2000 | Ohran |
| 6,658,591 | B1 | 12/2003 | Arndt |
| 6,910,160 | B2 | 6/2005 | Bajoria et al. |
| 6,944,847 | B2 | 9/2005 | Desai et al. |
| 7,063,395 | B2 | 6/2006 | Gagne et al. |
| 7,143,307 | B1 | 11/2006 | Witte et al. |
| 7,325,159 | B2 | 1/2008 | Stager et al. |
| 7,421,617 | B2 | 9/2008 | Anderson et al. |
| 7,464,126 | B2 | 12/2008 | Chen |
| 7,475,207 | B2 | 1/2009 | Bromling et al. |
| 7,516,287 | B2 | 4/2009 | Ahal et al. |
| 7,523,277 | B1 | 4/2009 | Kekre et al. |
| 7,557,867 | B2 | 7/2009 | Goo |
| 7,577,817 | B2 | 8/2009 | Karpoff et al. |
| 7,577,867 | B2 | 8/2009 | Lewin et al. |
| 7,603,395 | B1 | 10/2009 | Bingham et al. |
| 7,647,460 | B1 | 1/2010 | Wilson et al. |
| 7,720,817 | B2 | 5/2010 | Stager et al. |
| 7,765,433 | B1 | 7/2010 | Krishnamurthy |
| 7,791,091 | B2 | 9/2010 | Nagai |
| 7,849,361 | B2 | 12/2010 | Ahal et al. |
| 7,865,893 | B1 | 1/2011 | Omelyanchuk et al. |
| 7,971,091 | B1 | 6/2011 | Bingham et al. |
| 8,156,301 | B1 | 4/2012 | Khandelwal et al. |
| 8,352,941 | B1* | 1/2013 | Protopopov ........ G06F 9/45558 718/1 |
| 8,650,299 | B1 | 2/2014 | Huang et al. |
| 2004/0068561 | A1 | 4/2004 | Yamamoto et al. |
| 2004/0153639 | A1 | 8/2004 | Cherian et al. |
| 2005/0071588 | A1 | 3/2005 | Spear et al. |
| 2005/0171979 | A1 | 8/2005 | Stager et al. |
| 2005/0182953 | A1 | 8/2005 | Stager et al. |
| 2005/0188256 | A1 | 8/2005 | Stager et al. |
| 2006/0047996 | A1 | 3/2006 | Anderson et al. |
| 2006/0112222 | A1 | 5/2006 | Barrall |
| 2006/0129562 | A1 | 6/2006 | Pulamarasetti et al. |
| 2006/0161394 | A1 | 7/2006 | Dulberg et al. |
| 2007/0028244 | A1 | 2/2007 | Landis et al. |
| 2007/0162513 | A1 | 7/2007 | Lewin et al. |
| 2007/0220311 | A1 | 9/2007 | Lewin et al. |
| 2008/0086726 | A1 | 4/2008 | Griffith et al. |
| 2008/0177963 | A1 | 7/2008 | Rogers |
| 2008/0195624 | A1 | 8/2008 | Ponnappan et al. |
| 2009/0187776 | A1 | 7/2009 | Baba et al. |
| 2009/0249330 | A1 | 10/2009 | Abercrombie et al. |
| 2009/0283851 | A1 | 11/2009 | Chen |
| 2010/0017801 | A1 | 1/2010 | Kundapur |
| 2010/0027552 | A1* | 2/2010 | Hill ........................ H04L 12/66 370/401 |
| 2010/0150341 | A1 | 6/2010 | Dodgson et al. |
| 2010/0198972 | A1* | 8/2010 | Umbehocker ........ G06F 3/0604 709/226 |
| 2010/0250824 | A1 | 9/2010 | Belay |
| 2010/0274886 | A1 | 10/2010 | Nahum et al. |
| 2011/0022812 | A1* | 1/2011 | van der Linden ..... G06F 9/5077 711/163 |
| 2011/0075674 | A1* | 3/2011 | Li ...................... H04L 12/5695 370/401 |
| 2011/0099200 | A1 | 4/2011 | Blount et al. |
| 2011/0099342 | A1 | 4/2011 | Ozdemir |
| 2011/0125980 | A1 | 5/2011 | Brunet et al. |
| 2011/0131183 | A1 | 6/2011 | Chandhok et al. |
| 2011/0153569 | A1 | 6/2011 | Fachan et al. |
| 2011/0161299 | A1 | 6/2011 | Prahlad et al. |
| 2011/0161301 | A1 | 6/2011 | Pratt et al. |
| 2011/0264786 | A1 | 10/2011 | Kedem et al. |
| 2012/0110086 | A1 | 5/2012 | Baitinger et al. |
| 2012/0110572 | A1 | 5/2012 | Kodi et al. |
| 2012/0185913 | A1* | 7/2012 | Martinez ................ G06F 9/455 726/1 |
| 2013/0014104 | A1* | 1/2013 | Natanzon ............ G06F 9/45558 718/1 |

OTHER PUBLICATIONS

U.S. Final Office Action dated Dec. 30, 2013 in related U.S. Appl. No. 13/039,446, filed Mar. 3, 2011, 10 pages.

U.S. Non-Final Office Action dated Apr. 26, 2013 in related U.S. Appl. No. 13/367,448, filed Feb. 7, 2012, 19 pages.

U.S. Non-Final Office Action dated Jun. 21, 2013 in related U.S. Appl. No. 13/175,892, filed Jul. 4, 2011, 15 pages.

U.S. Non-Final Office Action dated Jun. 6, 2013 in related U.S. Appl. No. 13/039,446, filed Mar. 3, 2011, 12 pages.

U.S. Non-Final Office Action dated Mar. 4, 2013 in related U.S. Appl. No. 13/039,446, filed Mar. 3, 2011, 13 pages.

Amendment "B" and Response to Office Action from Prosecution History of U.S. Pat. No. 7,603,395, Apr. 9, 2009, (13 pages).

Amendment "E" and Response to Office Action from Prosecution History of U.S. Pat. No. 7,971,091., Nov. 19, 2010, (14 pages).

Amendment and Response to Office Action from Prosecution History of U.S. Pat. No. 7,647,460, Aug. 30, 1999(22 pages).

Answer Claim Construction Brief of Plaintiffs EMC Corporation and EMC Israel Development Center, LTD., *EMC Corporation and EMC Israel Development Center, LTD.*, v. *Zerto, Inc.*, Case No. 12-956(GMS), May 9, 2014, (24 pages).

Appellants' Brief Pursuant to 37 C.F.R section 1.192 from Prosecution History of U.S. Pat. No. 7,647,460., May 9, 2002, (34 pages).

Complaint, *EMC Corporation and EMC Israel Development Center, LTD.*, v. *Zerto, Inc.*, Case No.__Demand for Jury Trial, Jul. 20, 2012, (13 pages).

Defendant Zerto, Inc.'s Amended Answer to the First Amended Complaint, Affirmative Defense, and Counterclaims, *EMC Corporation and EMC Israel Development Center, LTD.*, v. *Zerto, Inc.*, Case No. 12-956-GMS, Aug. 7, 2014, (34 pages).

Defendant Zerto, Inc.'s Claim Construction Answering Brief, *EMC Corporation and EMC Israel Development Center, LTD.*, v. *Zerto, Inc.*, Case No. 12-956 (GMS), May 9, 2014, (23 pages).

Defendant Zerto, Inc.'s Opening Brief in Support of its Motion for Leave to Amend its Answer to the First Amended Complaint, Affirmative Defense and Counterclaims, *EMC Corporation and EMC Israel Development Center, LTD.*, v. *Zerto, Inc.*, Case No. 12-956-GMS, Jun. 6, 2014, (24 pages).

Defendant Zerto, Inc.'s Opening Brief in Support of Its Motion for Leave to Amend Its Answer to the First Amended Complaint, Affirmative Defense Aned Counterclaims, *EMC Corporation and EMC Israel Development Center, LTD.*, vs. *Zerto, Inc.*, Case No. 12-956(GMS) 24 pages, Jun. 6, 2014.

Defendant Zerto, Inc.'s Opening Claim Construction Brief., *EMC Corporation and EMC Israel Development Center, LTD.*, v. *Zerto, Inc.*, Case No. 12-956(GMS), Apr. 11, 2014, (26 pages).

Defendant Zerto, Inc.'s Reply Brief in Support of its Motion for Leave to Amend its Answer to the First Amended Compliant, Affrimative Defense and Counterclaims, *EMC Corporation and EMC Israel Development Center, LTD.*, v. *Zerto, Inc.*, Case No. 12-956-GMS, Jul. 9, 2014, (16 pages).

Defendant's Answering Brief in Opposition to Plaintiffs' Motion to Strik and Dismiss Defendant's Affirmative Defense and Counterclaims of "Invalidity" based on Assignor Estoppel, *EMC Corporation and EMC Israel Development Center, LTD.*, v. *Zerto, Inc.*, Case No. 12-956(GMS), Nov. 5, 2012, (21 pages).

EMC Corporation and EMC Israel Development Center, LTD.'s ANswer to the Amended Counterclaims of Zerto Inc., *EMC Corporation and EMC Israel Development Center, LTD.*, v. *Zerto, Inc.*, Case No. 12-956-GMS, Aug. 25, 2014, (12 pages).

EMC's Answer Brief in Opposition to Zerto's Motion for Judgment on the Pleadings on Count III o fthe First Amended Complaint, *EMC Corporation and EMC Israel Development Center, LTD.*, v. *Zerto, Inc.*, Case No. 12-956-GMS, Aug. 11, 2014, (25 pages).

(56) References Cited

OTHER PUBLICATIONS

EMC's Answering Brief in Opposition to Zerto's Motion for Leave to Amend its Answer to the First Amended Complaint by Adding an Inequitable Conduct Defense and Counterclaims, *EMC Corporation and EMC Israel Development Center, LTD.*, v. *Zerto, Inc.*, Case No. 12-956-GMS, Jun. 23, 2014 (25 pages).
Joint Appendix of Intrinsic and Dictionary Evidence, *EMC Corporation and EMC Israel Development Center, LTD.*, v. *Zerto, Inc.*, Case No. 12-956-GMS, May 12, 2014, (366 pages).
Joint Claim Construction Chart, *EMC Corporation and EMC Israel Development Center, Ltd.*, v. *Zerto, Inc.*, Case No. 12-956(GMS), Mar. 21, 2014, (24 pages).
Memorandum, *EMC Corporation and EMC Israel Development Center, LTD.*, v. *Zerto, Inc.*, Case No. 12-956-GMS, Jul. 31, 2014 (8 pages).
Opening Brief in Support of Defendant Zerto, Inc.'s Motion for Judgment on the Pleadings on Count III of the First Amended Compliant, *EMC Corporation and EMC Israel Development Center, LTD.*, v. *Zerto, Inc.*, Case No. 12-956-GMS, Jul. 25, 2014, (19 pages).
Order Construing the Terms of U.S. Pat. No. 7,647,460; 6,073,222; 7,603,395; 7,971,091; and 7,577,867, *EMC Corporation and EMC Israel Development Center, LTD.*, v. *Zerto, Inc.*, Case No. 12-956-GMS, Sep. 5, 2014, (0 pages).
Plaintiffs EMC Corporation and EMC Israel Development Center, LTD.'s Opening Claim Construction Brief, *EMC Corporation and EMC Israel Development Center, LTD.*,v. *Zerto, Inc.*, Case No. 12-956(GMS), Apr. 11, 2014, (26 pages).
Plaintiffs' Opening Brief in Support of their Motion to Strike and Dismiss Defendant's Affirmative Defense and Counterclaims of "Invalidity" Based on Assignor Estoppel, *EMC Corporation and EMC Israel Development Center, LTD.*, v. *Zerto, Inc.*, Case No. 12-956(GMS), Oct. 4, 2012, (18 pages).
Revised Joint Claim Construction Chart, *EMC Corporation and EMC Israel Development Center, LTD.*, v. *Zerto, Inc.*, Case No. 12-956(GMS), Apr. 11, 2014, (19 pages).
Revised Joint Claim Construction Chart, *EMC Corporation and EMC Israel Development Center, LTD.*, v. *Zerto, Inc.*, Case No. 12-956(GMS), Jun. 6, 2014, (19 pages).
Transcript of Markman Hearing, *EMC Corporation and EMC Israel Development Center, LTD.*, v. *Zerto, Inc.*, Case No. 12-956-GMS, Jun. 25, 2014 (94 pgs).
FreezeFrame User's Guide, Version 1.1, Document Version 1.1, 60 pgs, Nov. 1993.
Harper Collins, Collins English Dictionary, Third Edition Updated 1994, Section JA-258-260(3 pages).
Merriam-Webster, Inc., Webster's Third New International Dictionary, Section JA-276-279 (4 pages) Copyright 2002.
Microsoft Press, Microsoft Computer Dictionary, Fifth Edition, Section JA-341-343, p. 296 (4 pages) 2002.
Reference Model for Open Storage Systems Interconnection, Mass Storage System Reference Model Version 5, Sep. 1994 (36 pages).
Storage Networking Industry Association Dictionary, http://web.archive.org/web20060220153102/http://www.snia.org/education/dictionary/a, pp. JA-261-273 (13 pages) 2006.
Tech Target Search.,http://searchstorage.techtarget.com/definition/storage-snapshot.html, (p. JA-274) Jul. 2005.
The Kashya KB 4000 Administrators User Guide Product Release 2.0, 105 pgs, Aug. 2004.
The RecoveryONE Solution, Architecture Guide, Product Version 1.0, 22 pgs, Jan. 2006.
Warrick, et al, "IBM Total Storage Enterprise Storage Server Implementing ESS Copy Services in Open Environments", 642 pgs, IBM Jul. 2004.
Webster's New World Dictionary, Dictionary of Computer Terms, Sixth Edition, (4 pages).
Notice of Allowance for U.S. Appl. No. 13/175,892 mailed Dec. 23, 2014.
U.S. Final Office Action dated Feb. 13, 2014 in related U.S. Appl. No. 13/367,448, filed Feb. 7, 2012.
US Office Action dated Apr. 18, 2014 in related U.S. Appl. No. 13/175,892, filed Jul. 4, 2011.
US Office Action dated Jul. 17, 2014 in related U.S. Appl. No. 13/175,898, filed Jul. 7, 2011.
US Office Action in related U.S. Appl. No. 13/367,448, filed Feb. 3, 2015.
US Office Action on 13/039,446 dated Jan. 2, 2015.
Illuminata EMC RecoverPoint: Beyond Basics CDP Searched via internet on Nov. 10, 2013.
Mendocino: The RecoveryOne Solution, Architecture Guide, 22 pages Product Version 1.0, Jan. 3, 2006.
NetWorker PowerSnap Module for EMC Symmetrix, Realease 2.1 Installation and Administrator's Guide, 238 pgs, printed Sep. 2005.
Notice of Allowance for U.S. Appl. No. 13/175,892 dated Apr. 3, 2015.
US Office Action for U.S. Appl. No. 13/175,898 dated Mar. 25, 2015.
Olzak, T., "Secure hypervisor-based vitual server environments", Feb. 26, 2007. http://www.techrepublic.com/blog/security/secure-hypervisor-based-virtual-server-environments/160.
US Office Action on U.S. Appl. No. 14/687,341 dated Mar. 3, 2016.
Office Action on U.S. Appl. No. 13/175,898 dated Dec. 18, 2015.
"Zerto Hits Triple-Digit Growth Once Againl Builds Toward a Future of Uninterrupted Technology," Zerto, Feb. 3, 2015, 2 pages.
A Comparison of Hypervisor-based Replication vs. Current and Legacy BC/DR Technologies, 2012.
Choosing A VSS Provider Veeam Backup Guide for HyperV, Mar. 18, 2015.
Data Loss Avoidance: Near Continuous Data Protection and Streamlined Disaster Recovery, www.veeam.com.
Defendant Zerto, Inc's Motion for Judgment as a Matter of Law of No Willful Infringement of the '867 Patent . . . , Apr. 30, 2015.
Deploy Hyper-V Replica, published May 31, 2012.
Double-Take Availability for vSphere: Technical Data Sheet, 2014.
EMC Recoverpoint Family, 2012.
EMC Recoverpoint for Virtual Machines: Protects and Recovers VMs to Any Point in Time, 2012.
EMC's Answering Brief in Opposition of Zerto's Renewed Motion for Judgment as a Matter of Law or, in the Alternative, for a New Trial, Jul. 17, 2015.
EMC's Answering Brief in Opposition to Zerto's Motion for a New Trial and to Alter or Amend the Judgment, due to an Inconsistent Verdict, Jul. 17, 2015.
EMC's Opening Brief in Support of Its Motion for an Accounting and to Amend the Judgment, Jun. 24, 2015.
EMC's Opening Brief in Support of Its Renewed Motion for Judgment as a Matter of Law, Jun. 5, 2015.
Failed to Create a Quiesced Snapshot of a VM, Nov. 5, 2014, http://nakivo.com.
Features Nakivo Backup and Replication, accessed Jul. 7, 2015, http:www/nakivo.com/VMware-VM-backup-replication-features.htm.
HP 3PAR Remote Copy Software User Guide HP 3PAR OS 3.2.1 MU2, copyright 2009.
HP 3PAR Remote Copy Software, 2015, www.hp.com.
Hyper-V Replica Feature Overview, published Feb. 29, 2012.
Is Synchronous Replication Enough, May 29, 2013, http://www.zerto.com/blog/general/is-synchronous-replication-enough Judgment, May 21, 2015.
Letter regarding EMC's Request to File Summary Judgment Motions—Redacted, dated Feb. 13, 2015, 120 pages.
Letter to Judge Sleet re. *EMC Corporation* v. *Zerto, Inc.*, Feb. 6, 2015.
Letter to Judge Sleet Regarding EMC's Request for Summary Judgment, Oct. 21, 2014, 120 pages.
Managing VM Data with Tintri, Phillips, John, 2013.
Metro Mirror and Global Mirror.
Plaintiff's Motion for Judgment as a Matter of Law Pursuant to Fed. R. Civ. P. 50(a), May 6, 2015.
ReplicateVM, Replicate VMs, not LUNS, Jul. 7, 2015, http://www.tintri.com/producs/replicatevm.
Report on the Filing or Determination of an Action Regarding a Patent or Trademark, May 22, 2015.

(56) References Cited

OTHER PUBLICATIONS

Scalable, High-Performance, and Cost-Effective Remote Replication on Hitachi Unified Storage and Brocade Extension Platforms, 2012, www.brocade.com.
Unitrends Enterprise Backup Software and Solutions, 2015, http://www.unitrends.com/products/enterprise-backup-software/unitrends-enterprise-backup.
Unitrends Release 7.3 Beta Now Available, Nov. 26, 2013, http://blogs.unitrends.com/unitrends-release-7-3-beta-now-available/.
Using Double-Take Software and the Virtual Recovery Appliance, http://www.discoposse.com/index.php/category/technology/.
Veeam Backup and Replication v8, www.veeam.com.
VMware ESXi and ESX Replication for Simple Fast Disaster Recovery, http://software.dell.com/products/vreplicator/.
VMware vCenter Site Recovery Manager5 with vSphere Replication, 2011.
VMware vSphere Replication 6.0, Apr. 2015.
vReplicator Version 3.0, 2009.
Zerto Announces General Availability of Zerto Virtual Replication Version 4.0, May 5, 2015.
Zerto Inc.'s Motion for Judgment as a Matter of Law, May 6, 2015.
Zerto Raises 26 Million in Series D Financing to Accelerate Hybrid Cloud Adoption, Jun. 18, 2014.
Zerto Virtual Replication Release Notes, 2015.
Zerto, Inc's Brief in Support of Its Motion for a New Trial, and to Alter or Amend the Judgment, Due to an Inconsistent Verdict, Jun. 19, 2015.
Zerto, Inc's Brief in Support of Its Renewed Motion for Judgment as a Matter of Law or, In the Alternative, for a New Trial, Jun. 19, 2015.
Zerto's Hypervisor-based Replication: A New Approach to Business/Continuity Disaster Recovery, 2012.
Zerto's Hypervisor-Based, Enterprise-Class Replication and Continuous Data Protection, 2012.
Zerto's Protect Applications, Not Just Data: BC/DR for Virtualized Applications, 2012.
Zerto's ZVR and Hyper-V, 2014.
US Office Action on 103564-0103 DTD Sep. 1, 2015.
US Office Action on 103564-0108 DTD Sep. 1, 2015.
US Office Action on 103564-0121 DTD Sep. 11, 2015.

* cited by examiner

FIG. 18

MULTIPLE POINTS IN TIME DISK IMAGES FOR DISASTER RECOVERY

CROSS REFERENCES TO RELATED APPLICATIONS

This application is a continuation-in-part of U.S. application Ser. No. 13/175,898 entitled METHODS AND APPARATUS FOR PROVIDING HYPERVISOR LEVEL DATA SERVICES FOR SERVER VIRTUALIZATION, filed on Jul. 4, 2011 by inventors Ziv Kedem, Gil Levonai, Yair Kuszpet and Chen Burshan, which is a continuation-in-part of U.S. application Ser. No. 13/039,446, entitled METHODS AND APPARATUS FOR PROVIDING HYPERVISOR LEVEL DATA SERVICES FOR SERVER VIRTUALIZATION, filed on Mar. 3, 2011 by inventor Ziv Kedem, which claims priority benefit of U.S. Provisional Application No. 61/314,589, entitled METHODS AND APPARATUS FOR PROVIDING HYPERVISOR LEVEL DATA SERVICES FOR SERVER VIRTUALIZATION, filed on Mar. 17, 2010 by inventor Ziv Kedem.

FIELD OF THE INVENTION

The present invention relates to data protection and recovery.

BACKGROUND OF THE INVENTION

Data is at the heart of every enterprise, and is a core component of a data center infrastructure. As data applications become more and more critical, there is a growing need for disaster recovery systems to support application deployment, and provide complete business continuity.

Disaster recovery systems are responsible for data protection and application recovery. Some disaster recovery systems provide continuous data protection, and allow recovery to any point-in-time.

Some disaster recovery systems provide built-in test capabilities, which enable an administrator to test recovery to a previous point in time. When a previous point in time is selected for testing by a disaster recovery system, a disk image is presented to the enterprise data applications, as the disk image existed at the previous point in time. All reads from the disk are directed to the disaster recovery system, which determines where the data for the previous point in time is located—on a replica, or on a redo journal. All writes to the disk are recorded in a separate redo log, to be able to erase them after the test is complete.

There are many advantages to testing a previous point-in-time image, including ensuring that a replica is usable, and finding a point-in-time for recovery prior to a disaster. In a case where data became corrupted at an unknown time, it is of advantage to find a previous point in time as close as possible to the time of corruption, at which the disk image was uncorrupted, in order to minimize loss of data after recovery.

Objectives of disaster recovery plans are generally formulated in terms of a recovery time objective (RTO). RTO is the time it takes to get a non-functional system back on-line, and indicates how fast the organization will be up and running after a disaster. Specifically, RTO is the duration of time within which a business process must be restored after a disaster, in order to avoid unacceptable consequences associated with a break in business continuity. Searching for an appropriate point-in-time prior to failover generally requires testing multiple disk images at different points-in-time, which itself requires a long time to complete and significantly increases the RTO.

In addition, testing multiple disk images generally requires a complete copy of the data. As such, if a disk image is 2 TB and three points in time are to be tested, the storage consumption is at least 8 TB, corresponding to three tests and the replica's gold copy. This drawback makes it costly and impractical to test multiple disk copies in parallel.

It would thus be of advantage to expose multiple disk images at different points in time, as offsets from a gold image, to enable testing in parallel and then selecting a disk image for failover without duplication of data, to support the enterprise RTO.

SUMMARY OF THE DESCRIPTION

Aspects of the present invention provide systems and methods to expose multiple disk images at different points in time, thereby enabling testing in parallel and then selecting a disk image for failover.

Aspects of the present invention relate to a dedicated virtual data service appliance (VDSA) within a hypervisor that can provide a variety of data services. Data services provided by the VDSA include inter alia replication, monitoring and quality of service. The VDSA is fully application-aware.

In an embodiment of the present invention, a tapping filter driver is installed within the hypervisor kernel. The tapping driver has visibility to I/O requests made by virtual servers running on the hypervisor.

A VDSA runs on each physical hypervisor. The VDSA is a dedicated virtual server that provides data services; however, the VDSA does not necessarily reside in the actual I/O data path. When a data service processes I/O asynchronously, the VDSA receives the data outside the data path.

Whenever a virtual server performs I/O to a virtual disk, the tapping driver identifies the I/O requests to the virtual disk. The tapping driver copies the I/O requests, forwards one copy to the hypervisor's backend, and forwards another copy to the VDSA.

Upon receiving an I/O request, the VDSA performs a set of actions to enable various data services. A first action is data analysis, to analyze the data content of the I/O request and to infer information regarding the virtual server's data state. E.g., the VDSA may infer the operating system level and the status of the virtual server. This information is subsequently used for reporting and policy purposes.

A second action, optionally performed by the VDSA, is to store each I/O write request in a dedicated virtual disk for journaling. Since all I/O write requests are journaled on this virtual disk, the virtual disk enables recovery data services for the virtual server, such as restoring the virtual server to an historical image.

A third action, optionally performed by the VDSA, is to send I/O write requests to different VDSAs, residing on hypervisors located at different locations, thus enabling disaster recovery data services.

The hypervisor architecture of the present invention scales to multiple host sites, each of which hosts multiple hypervisors. The scaling flexibly allows for different numbers of hypervisors at different sites, and different numbers of virtual services and virtual disks within different hypervisors. Each hypervisor includes a VDSA, and each site includes a data services manager to coordinate the VSDA's at the site, and across other sites.

Embodiments of the present invention enable flexibly designating one or more virtual servers within one or more hypervisors at a site as being a virtual protection group, and flexibly designating one or more hypervisors, or alternatively one or more virtual servers within one or more hypervisors at another site as being a replication target for the virtual protection group. Write order fidelity is maintained for virtual protection groups. A site may comprise any number of source and target virtual protection groups. A virtual protection group may have more than one replication target. The number of hypervisors and virtual servers within a virtual protection group and its replication target are not required to be the same.

The hypervisor architecture of the present invention may be used to provide cloud-based hypervisor level data services to multiple enterprises on a shared physical infrastructure, while maintaining control and data path separation between enterprises for security.

The present invention provides bi-directional cloud-based data replication services; i.e., from the enterprise to the cloud, and from the cloud to the enterprise. Moreover, replication targets may be assigned to a pool of resources that do not expose the enterprise infrastructure, thus providing an additional layer of security and privacy between enterprises that share a target physical infrastructure.

The cloud-based data replication services of the present invention support enforcement of data export regulations. As such, data transfer between a source and a destination is automatically restricted if data export regulations restrict data transfer between the corresponding jurisdictions of the source and the destination.

There is thus provided in accordance with an embodiment of the present invention an enterprise disaster recovery system, including at least one data disk, a processor for running at least one data application that reads data from the at least one data disk and writes data to the at least one data disk over a period of time, a recovery test engine that (i) generates in parallel a plurality of processing stacks corresponding to a respective plurality of previous points in time within the period of time, each stack operative to process a command to read data at a designated address from a designated one of the at least one data disk and return data at the designated address in an image of the designated data disk at the previous point in time corresponding to the stack, and (ii) that generates in parallel a plurality of logs of commands issued by the at least one data application to write data into designated addresses of designated ones of the plurality of data disks, each log corresponding to a respective previous point in time, wherein the plurality of previous points in time within the period of time are specified arbitrarily by a user of the system.

There is additionally provided in accordance with an embodiment of the present invention a method for testing enterprise disaster recovery, including receiving an arbitrarily designated plurality of points in time for conducting data recovery tests in parallel, generating in parallel a plurality of processing stacks, each stack corresponding to one of the designated points in time, and each stack operative to receive a command issued by at least one data application to read data from a designated address from a designated data disk and to return data at the designated address in an image of the designated data disk at the designated point in time corresponding to the stack, further generating in parallel a plurality of write commands issued by the at least one data application to write data into designated addresses of designated data disks, and logging the write commands in a plurality of logs, each log corresponding to one of the designated points in time.

BRIEF DESCRIPTION OF THE DRAWINGS

The present invention will be more fully understood and appreciated from the following detailed description, taken in conjunction with the drawings in which:

FIG. 18 is a user interface screenshot with a summary of the recovery tests, including the times at which the tests were stopped, in accordance with an embodiment of the present invention;

LIST OF APPENDICES

Appendix I is an application programming interface for virtual replication site controller web services, in accordance with an embodiment of the present invention;

Appendix II is an application programming interface for virtual replication host controller web services, in accordance with an embodiment of the present invention;

Appendix III is an application programming interface for virtual replication protection group controller web services, in accordance with an embodiment of the present invention;

Appendix IV is an application programming interface for virtual replication command tracker web services, in accordance with an embodiment of the present invention; and Appendix V is an application programming interface for virtual replication log collector web services, in accordance with an embodiment of the present invention.

DETAILED DESCRIPTION

Aspects of the present invention relate to a dedicated virtual data services appliance (VDSA) within a hypervisor, which is used to provide a variety of hypervisor data services. Data services provided by a VDSA include inter alia replication, monitoring and quality of service.

Figure 1:
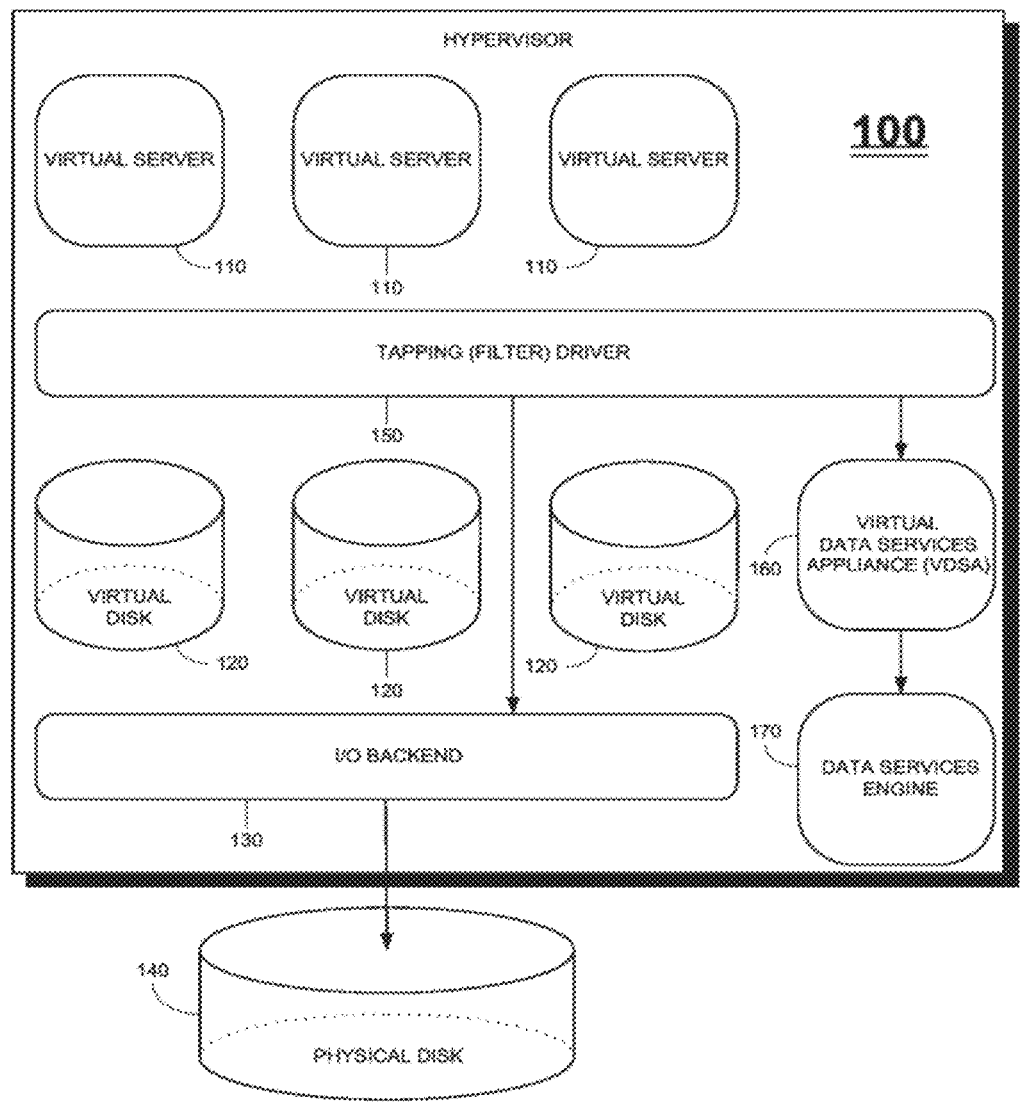
FIG. 1 is a simplified block diagram of a hypervisor architecture that includes a tapping driver and a virtual data services appliance, in accordance with an embodiment of the present invention.

Reference is made to FIG. 1, which is a simplified block diagram of a hypervisor architecture that includes a tapping driver and a VDSA, in accordance with an embodiment of the present invention. Shown in FIG. 1 is a hypervisor 100 with three virtual servers 110, three virtual disks 120, an I/O backend 130 and a physical storage array 140. Hypervisor 100 uses a single physical server, but runs multiple virtual servers 110. Virtual disks 120 are a storage emulation layer that provide storage for virtual servers 110. Virtual disks 120 are implemented by hypervisor 100 via I/O backend 130, which connects to physical disk 140.

Hypervisor 100 also includes a tapping driver 150 installed within the hypervisor kernel. As shown in FIG. 1, tapping driver 150 resides in a software layer between virtual servers 110 and virtual disks 120. As such, tapping driver 150 is able to access I/O requests performed by virtual servers 110 on virtual disks 120. Tapping driver 150 has visibility to I/O requests made by virtual servers 110.

Hypervisor 100 also includes a VDSA 160. In accordance with an embodiment of the present invention, a VDSA 160 runs on a separate virtual server within each physical hypervisor. VDSA 160 is a dedicated virtual server that provides data services via one or more data services engines 170. However, VDSA 160 does not reside in the actual I/O data path between I/O backend 130 and physical disk 140. Instead, VDSA 160 resides in a virtual I/O data path.

Whenever a virtual server 110 performs I/O on a virtual disk 120, tapping driver 150 identifies the I/O requests that the virtual server makes. Tapping driver 150 copies the I/O requests, forwards one copy via the conventional path to I/O backend 130, and forwards another copy to VDSA 160. In turn, VDSA 160 enables the one or more data services engines 170 to provide data services based on these I/O requests.

Figure 2:
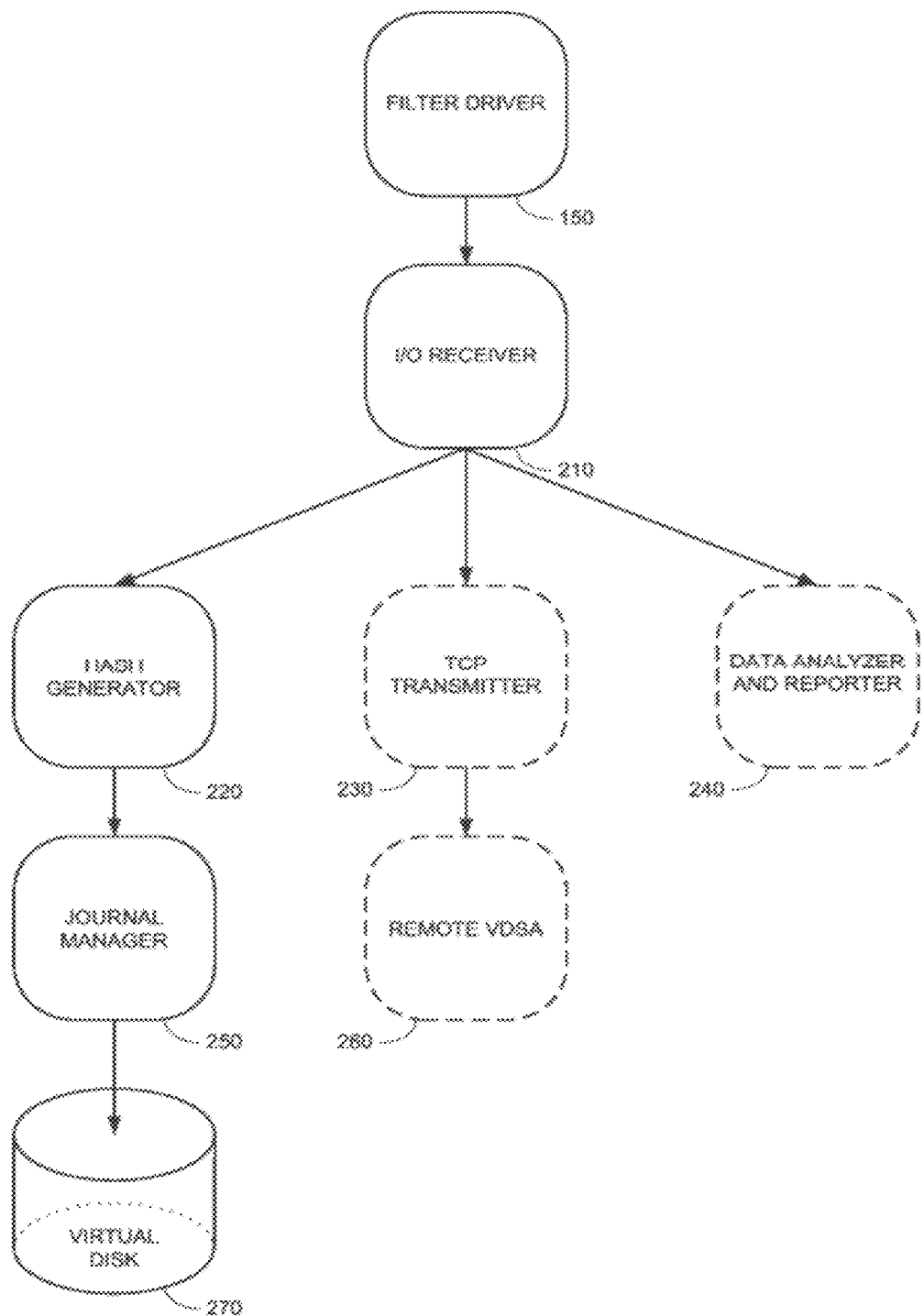
FIG. 2 is a simplified data flow chart for a virtual data services appliance, in accordance with an embodiment of the present invention.

Reference is made to FIG. 2, which is a simplified data flow chart for a VDSA, in accordance with an embodiment of the present invention. Shown in FIG. 2 are an I/O receiver 210, a hash generator 220, a TCP transmitter 230, a data analyzer and reporter 240, a journal manager 250 and a remote VDSA 260. Remote VDSA 260 resides on different physical hardware, at a possibly different location.

As shown in FIG. 2, I/O receiver 210 receives an intercepted I/O request from tapping driver 150. VDSA 160 makes up to three copies of the received I/O requests, in order to perform a set of actions which enable the one or more data services engines 170 to provide various services.

A first copy is stored in persistent storage, and used to provide continuous data protection. Specifically, VDSA 160 sends the first copy to journal manager 250, for storage in a dedicated virtual disk 270. Since all I/O requests are journaled on virtual disk 270, journal manager 250 provides recovery data services for virtual servers 110, such as restoring virtual servers 110 to an historical image. In order to conserve disk space, hash generator 220 derives a one-way hash from the I/O requests. Use of a hash ensures that only a single copy of any I/O request data is stored on disk.

An optional second copy is used for disaster recovery. It is sent via TCP transmitter 230 to remote VDSA 260. As such, access to all data is ensured even when the production hardware is not available, thus enabling disaster recovery data services.

An optional third copy is sent to data analyzer and reporter 240, which generates a report with information about the content of the data. Data analyzer and reporter 240 analyzes data content of the I/O requests and infers information regarding the data state of virtual servers 110. E.g., data analyzer and reporter 240 may infer the operating system level and the status of a virtual server 110.

Figure 3:
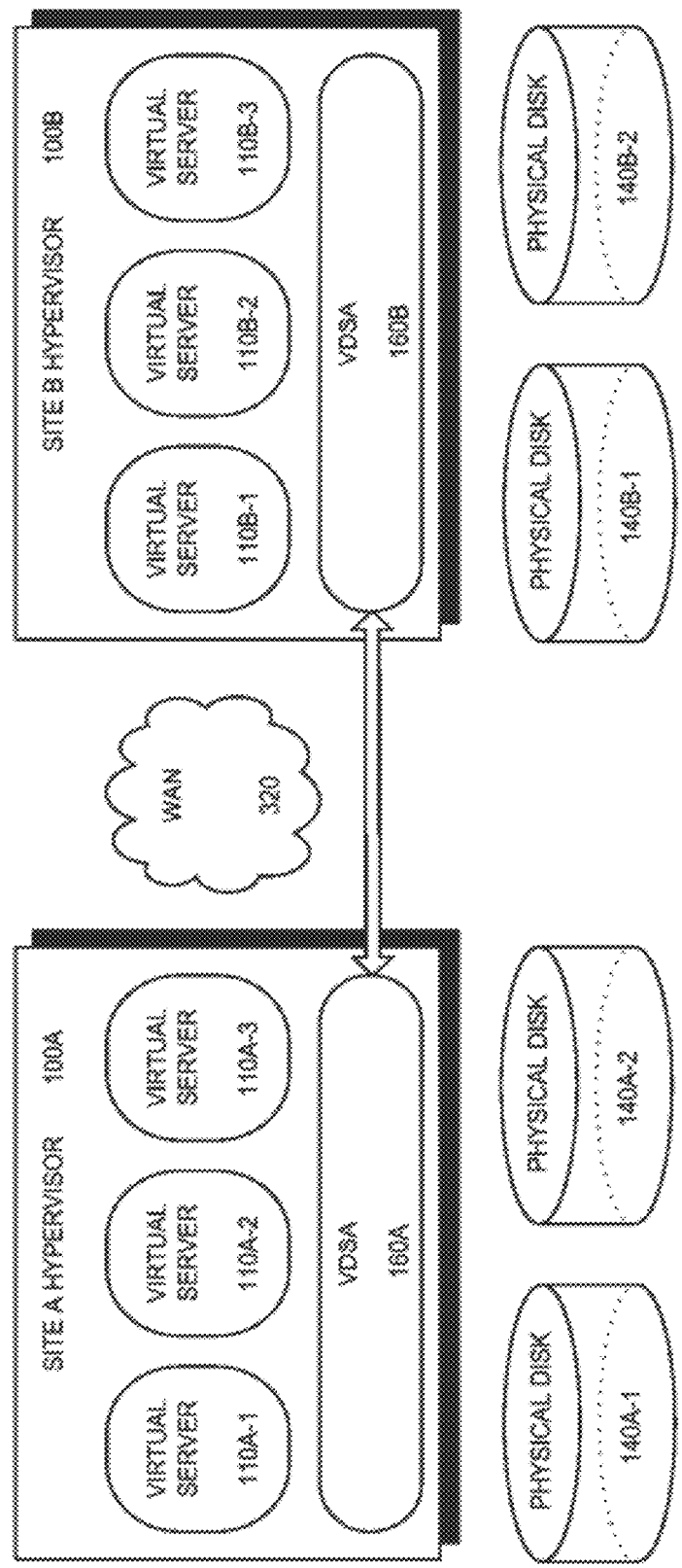
FIG. 3 is a simplified block diagram of a virtual replication system, in accordance with an embodiment of the present invention.

Reference is made to FIG. 3, which is a simplified block diagram of a virtual replication system, in accordance with an embodiment of the present invention. Shown in FIG. 3 is a protected site designated Site A, and a recovery site designated Site B. Site A includes a hypervisor 100A with three virtual servers 110A-1, 110A-2 and 110A-3, and a VDSA 160A. Site A includes two physical disks 140A-1 and 140A-2. Site B includes a hypervisor 100B with a VDSA 160B. Site B includes two physical disks 140B-1 and 140B-2. All or some of virtual servers 110A-1, 110A-2 and 110A-3 may be designated as protected. Once a virtual server is designated as protected, all changes made on the virtual server are replicated at the recovery site.

In accordance with an embodiment of the present invention, every write command from a protected virtual server in hypervisor 100A is intercepted by tapping driver 150 (FIG. 1) and sent asynchronously by VDSA 160A to VDSA 160B for replication, via a wide area network (WAN) 320, while the write command continues to be processed by the protected server.

At Site B, the write command is passed to a journal manager 250 (FIG. 2), for journaling on a Site B virtual disk 270 (FIG. 2). After every few seconds, a checkpoint is written to the Site B journal, and during a recovery one of the checkpoints may be selected for recovering to that point. Additionally, checkpoints may be manually added to the Site B journal by an administrator, along with a description of the checkpoint. E.g., a checkpoint may be added immediately prior to an event taking place that may result in the need to perform a recovery, such as a patch installation, an application upgrade, and a planned switch over to an emergency generator.

In addition to write commands being written to the Site B journal, mirrors 110B-1, 110B-2 and 110B-3 of the respective protected virtual servers 110A-1, 110A-2 and 110A-3 at Site A are created at Site B. The mirrors at Site B are updated at each checkpoint, so that they are mirrors of the corresponding virtual servers at Site A at the point of the last checkpoint.

During a failover, an administrator can specify that he wants to recover the virtual servers using the latest data sent from the Site A. Alternatively the administrator can specify an earlier checkpoint, in which case the mirrors on the virtual servers 110B-1, 110-B-2 and 110B-3 are rolled back to the earlier checkpoint, and then the virtual servers are recovered to Site B. As such, the administrator can recover the environment to the point before any corruption, such as a crash or a virus, occurred, and ignore the write commands in the journal that were corrupted.

VDSAs 160A and 160B ensure write order fidelity; i.e., data at Site B is maintained in the same sequence as it was written at Site A. Write commands are kept in sequence by assigning a timestamp or a sequence number to each write at Site A. The write commands are sequenced at Site A, then transmitted to Site B asynchronously, then reordered at Site B to the proper time sequence, and then written to the Site B journal.

The journal file is cyclic; i.e., after a pre-designated time period, the earliest entries in the journal are overwritten by the newest entries.

It will be appreciated by those skilled in the art that the virtual replication appliance of the present invention operates at the hypervisor level, and thus obviates the need to consider physical disks. In distinction, conventional replication systems operate at the physical disk level. Embodiments of the present invention recover write commands at the application level. Conventional replication systems recover write commands at the SCSI level. As such, conventional replication systems are not fully application-aware, whereas embodiment of the present invention are full application-aware, and replicate write commands from an application in a consistent manner.

The present invention offers many advantages.

Hardware Agnostic: Because VDSA 160 manages recovery of virtual servers and virtual disks, it is not tied to specific hardware that is used at the protected site or at the recovery site. The hardware may be from the same vendor, or from different vendors. As long as the storage device supports the iSCSI protocol, any storage device, known today or to be developed in the future, can be used.

Fully Scalable: Because VDSA 160 resides in the hypervisor level, architectures of the present invention scale to multiple sites having multiple hypervisors, as described hereinbelow with reference to FIG. 4.

Efficient Asynchronous Replication: Write commands are captured by VDSA 160 before they are written to a physical disk at the protected site. The write commands are sent to the recovery site asynchronously, and thus avoid long distance replication latency. Moreover, only delta changes are sent to the recovery site, and not a whole file or disk, which reduces the network traffic, thereby reducing WAN requirements and improving recovery time objective and recovery point objective.

Control of Recovery: An administrator controls when a recovery is initiated, and to what point in time it recovers.

Near-Zero Recovery Point Objective (RPO): VDSA 160 continuously protects data, sending a record of every write command transacted at the protected site to the recovery site. As such, recovery may be performed within a requested RPO.

Near-Zero Recovery Time Objective (RTO): During recovery the mirrors of the protected virtual servers are recovered at the recovery site from VDSA 160B, and synchronized to a requested checkpoint. In accordance with an embodiment of the present invention, during synchronization and while the virtual servers at the recovery site are not yet fully synchronized, users can nevertheless access the virtual servers at the recovery site. Each user request to a virtual server is analyzed, and a response is returned either from the virtual server directly, or from the journal if the information in the journal is more up-to-date. Such analysis of user requests continues until the recovery site virtual environment is fully synchronized.

WAN Optimization between Protected and Recovery Sites: In accordance with an embodiment of the present invention, write commands re compressed before being sent from VDSA 160A to VDSA 160B, with throwing used to prioritize network traffic. As such, communication between the protected site and the recovery site is optimized.

WAN Failover Resilience: In accordance with an embodiment of the present invention, data is cached prior to being transmitted to the recovery site. If WAN 320 goes down, the cached data is saved and, as soon as WAN 320 comes up again, the data is sent to the recovery site and both sites are re-synchronized.

Single Point of Control: In accordance with an embodiment of the present invention, both the protected and the recovery site are managed from the same client console.

Secure Mufti-Tenant Solution on Shared Hardware: The present invention enables multiple enterprises to use shared hardware at a recovery site for data replication, while maintaining security between the enterprises, as described hereinbelow with reference to FIGS. 9-12.

Figure 4:
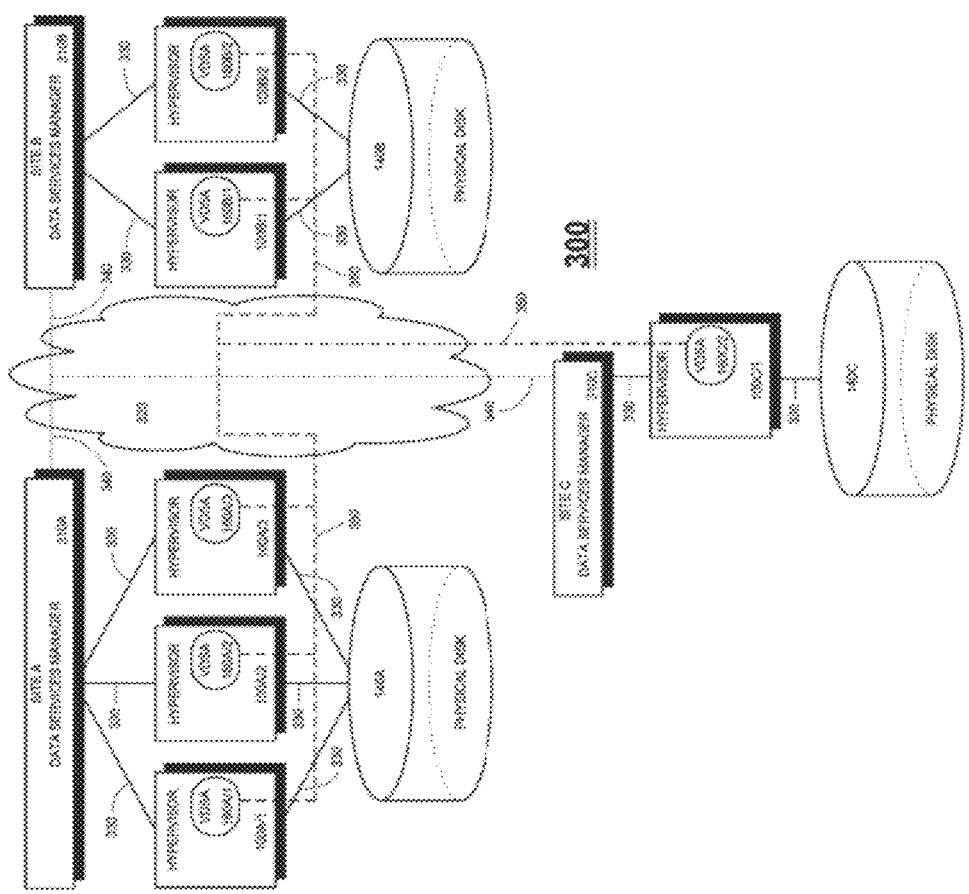
FIG. 4 is a simplified block diagram of a cross-host multiple hypervisor system that includes data services managers for multiple sites that have multiple hypervisors, in accordance with an embodiment of the present invention.

As indicated hereinabove, the architecture of FIG. 1 scales to multiple sites having multiple hypervisors. Reference is made to FIG. 4, which is a simplified block diagram of a cross-host multiple hypervisor system 300 that includes data services managers for multiple sites that have multiple hypervisors, in accordance with an embodiment of the present invention. The architecture of FIG. 4 includes three sites, designated Site A, Site B and Site C, the three sites being communicatively coupled via a network 320. Each site includes one or more hypervisors 100. Specifically, Site A includes three hypervisors, 100A/1, 100A/2 and 100A/3, Site B includes two hypervisors, 100B/1 and 100B/2, and Site C includes one hypervisor 100C/1. The sites have respective one or more physical disks 140A, 140B and 140C.

Figure 7:
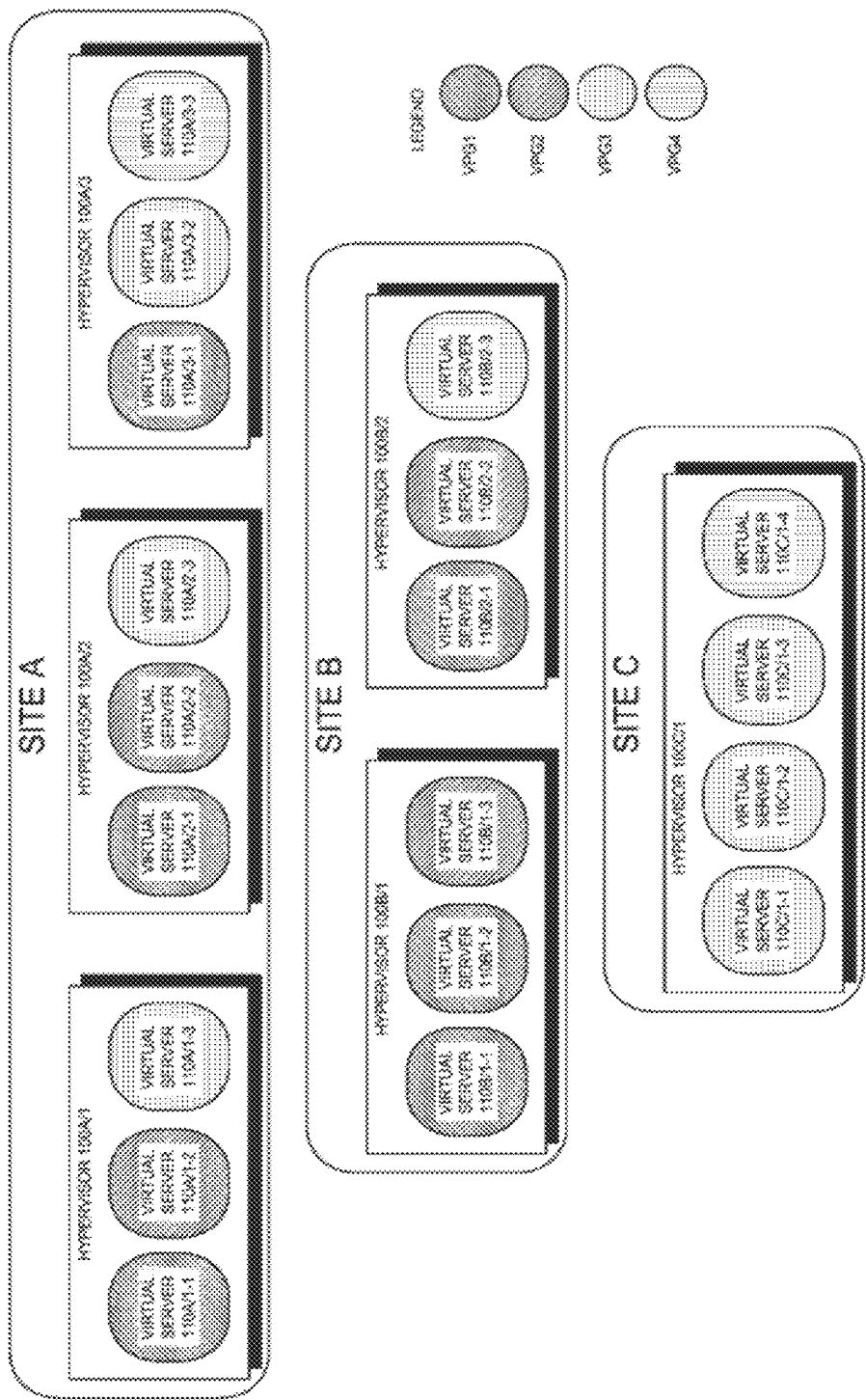
FIG. 7 is an example an environment for the system of FIG. 4, in accordance with an embodiment of the present invention.

The hypervisors are shown in system 300 with their respective VDSA's 160A/1, 160A/2, ..., and the other components of the hypervisors, such as the virtual servers 110 and virtual disks 120, are not shown for the sake of clarity. An example system with virtual servers 110 is shown in FIG. 7, and described hereinbelow.

The sites include respective data services managers 310A, 310B and 310C that coordinate hypervisors in the sites, and coordinate hypervisors across the sites.

The system of FIG. 4 may be used for data replication, whereby data at one site is replicated at one or more other sites, for protection. The solid communication lines 330 in FIG. 4 are used for in-site traffic, the dashed communication lines 340 are used for replication traffic between sites, and the dotted communication lines 350 are used for control traffic between data services managers.

Data services managers 310A, 310B and 310C are control elements. The data services managers at each site communicate with one another to coordinate state and instructions. The data services managers track the hypervisors in the environment, and track health and status of the VDSAs 160A/1, 160A/2, ....

It will be appreciated by those skilled in the art that the environment shown in FIG. 4 may be re-configured by moving one or more virtual servers 110 from one hypervisor 100 to another, by moving one or more virtual disks 120 from one hypervisor 100 to another, and by adding one or more additional virtual servers 110 to a hypervisor 100.

In accordance with an embodiment of the present invention, the data services managers enable designating groups of specific virtual servers 110, referred to as virtual protection groups, to be protected. For virtual protection groups, write order fidelity is maintained. The data services managers enable designating a replication target for each virtual protection group; i.e., one or more sites, and one or more hypervisors in the one or more sites, at which the virtual protection group is replicated. A virtual protection group may have more than one replication target. The number of hypervisors and virtual servers within a virtual protection group and its replication target are not required to be the same.

Figure 5:
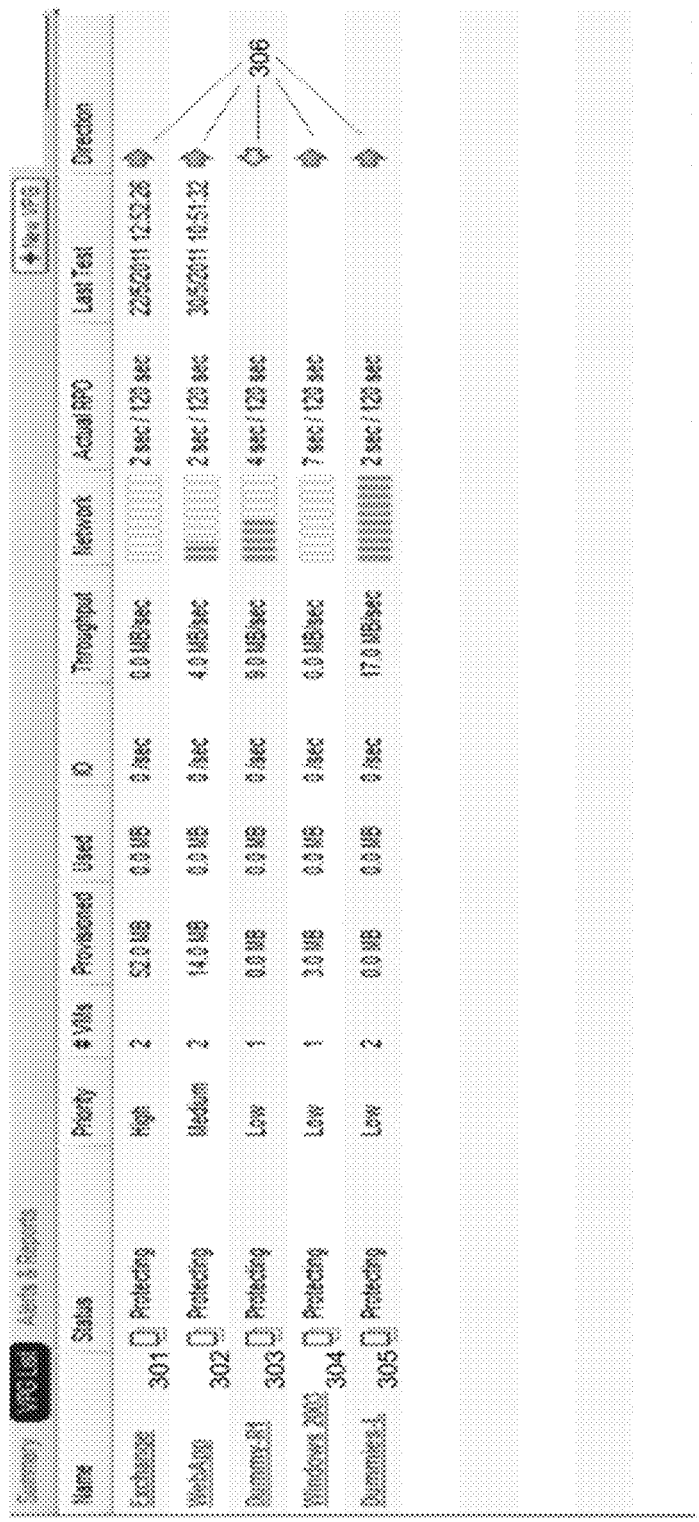
FIG. 5 is a user interface screenshot of bi-directional replication of virtual protection groups, in accordance with an embodiment of the present invention.

Reference is made to FIG. 5, which is a user interface screenshot of bi-directional replication of virtual protection groups, in accordance with an embodiment of the present invention. Shown in FIG. 4 are virtual protection groups 301 ("Exchange"), 302 ("WebApp"), 303 ("Dummy-R1"), 304 ("Windows 2003") and 305 (Dummies-L"). Arrows 306 indicate direction of replication.

Figure 6:
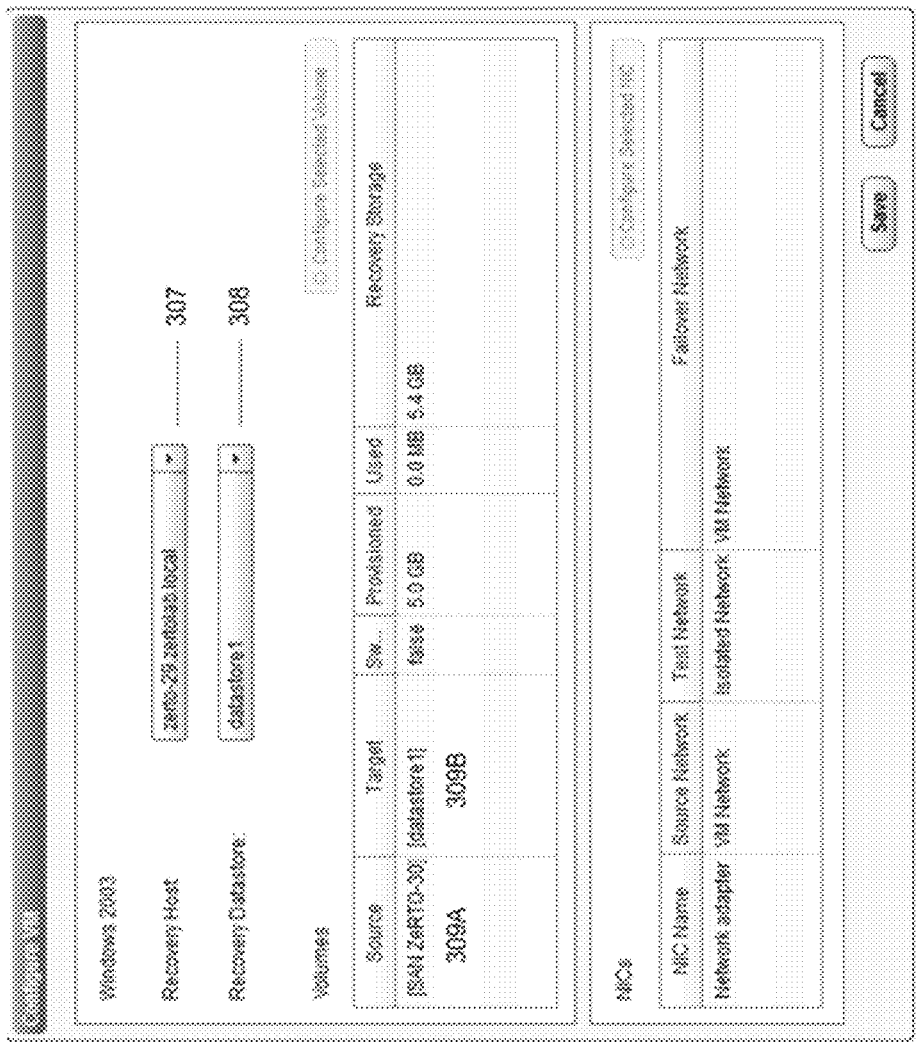
FIG. 6 is a user interface screenshot of assignment of a replication target for a virtual protection group, in accordance with an embodiment of the present invention.

Reference is made to FIG. 6, which is a user interface screenshot of assignment of a replication target for a virtual protection group, in accordance with an embodiment of the present invention. Shown in FIG. 6 is an entry 307 for designating a recovery host, and an entry 308 for designating a recovery datastore for virtual protection group 304 ("Windows 2003") of FIG. 5. Respective source and target datastores, [SAN ZeRTO-30] 309A and [datastore1] 309B, are shown as being paired.

More generally, the recovery host may be assigned to a cluster, instead of to a single hypervisor, and the recovery datastore may be assigned to a pool of resources, instead of to a single datastore. Such assignments are of particular advantage when different enterprises share the same physical infrastructure for target replication, as such assignments mask the virtual infrastructure between the different enterprises.

The data services managers synchronize site topology information. As such, a target site's hypervisors and datastores may be configured from a source site.

Virtual protection groups enable protection of applications that run on multiple virtual servers and disks as a single unit. E.g., an application that runs on virtual servers many require a web server and a database, each of which run on a different virtual server than the virtual server that runs the application. These virtual servers may be bundled together using a virtual protection group.

Referring back to FIG. 4, data services managers 310A, 310B and 310C monitor changes in the environment, and automatically update virtual protection group settings accordingly. Such changes in the environment include inter alia moving a virtual server 110 from one hypervisor 100 to another, moving a virtual disk 120 from one hypervisor 100 to another, and adding a virtual server 110 to a hypervisor 100.

For each virtual server 110 and its target host, each VDSA 160A/1, 160A/2, . . . replicates IOs to its corresponding replication target. The VDSA can replicate all virtual servers to the same hypervisor, or to different hypervisors. Each VDSA maintains write order fidelity for the IOs passing through it, and the data services manager coordinates the writes among the VDSAs.

Since the replication target hypervisor for each virtual server 110 in a virtual protection group may be specified arbitrarily, all virtual servers 110 in the virtual protection group may be replicated at a single hypervisor, or at multiple hypervisors. Moreover, the virtual servers 110 in the source site may migrate across hosts during replication, and the data services manager tracks the migration and accounts for it seamlessly.

Reference is made to FIG. 7, which is an example an environment for system 300, in accordance with an embodiment of the present invention. As shown in FIG. 7, system 300 includes the following components.

Site A
Hypervisor 100A/1: virtual servers 110A/1-1, 110A/1-2, 110A/1-3.
Hypervisor 100A/2: virtual servers 110A/2-1, 110A/2-2, 110A/2-3.
Hypervisor 100A/3: virtual servers 110A/3-1, 110A/3-2, 110A/3-3.

Site B
Hypervisor 100B/1: virtual servers 110B/1-1, 110B/1-2, 110B/1-3.
Hypervisor 100B/2: virtual servers 110B/2-1, 110B/2-2, 110B/2-3.

Site C
Hypervisor 100C/1: virtual servers 110C/1-1, 110C/1-2, 110C/1-3, 110C/1-4.

As further shown in FIG. 7, system 300 includes the following virtual protection groups. Each virtual protection group is shown with a different hatching, for clarity.

VPG1 (shown with upward-sloping hatching)
    Source at Site A: virtual servers 110A/1-1, 110A/2-1, 110A/3-1
    Replication Target at Site B: virtual servers 110B/1-1, 110B/1-2, 110B/2-1
VPG2 (shown with downward-sloping hatching)
    Source at Site B: virtual servers 110B/1-3, 110B/2-2
    Replication Target at Site A: virtual servers 110A/1-2, 110A/2-2
VPG3 (shown with horizontal hatching)
    Source at Site A: virtual server 110A/3-3
    Replication Target at Site B: virtual server 110B/2-3
    Replication Target at Site C: virtual server 110C/1-4
VPG4 (shown with vertical hatching)
    Source at Site A: virtual servers 110A/1-3, 110A/2-3, 110A/3-2
    Replication Target at Site C: virtual servers 110C/1-1, 110C/1-2, 110C/1-3

As such, it will be appreciated by those skilled in the art that the hypervisor architecture of FIG. 1 scales to multiple host sites, each of which hosts multiple hypervisors. The scaling flexibly allows for different numbers of hypervisors at different sites, and different numbers of virtual services and virtual disks within different hypervisors.

The scaling flexibility of the present invention also allows extension to cloud-based data services provided by a cloud provider on a shared infrastructure, as explained hereinbelow.

Cloud-based data services enable data center providers to service multiple enterprises at data centers that are remote from the enterprises. Cloud-based data services offer many advantages. Enterprises that use cloud-based data services obviate the needs for servers, SAN/NAS, networks, communication lines, installation, configuration and ongoing maintenance of information technology systems, and overhead expenses for electricity, cooling and space. However, conventional cloud-based data suffer from weakness of security due to multiple enterprises sharing the same physical infrastructure, and due to multiple enterprises using the same networks and IPs for their services.

Figure 8:
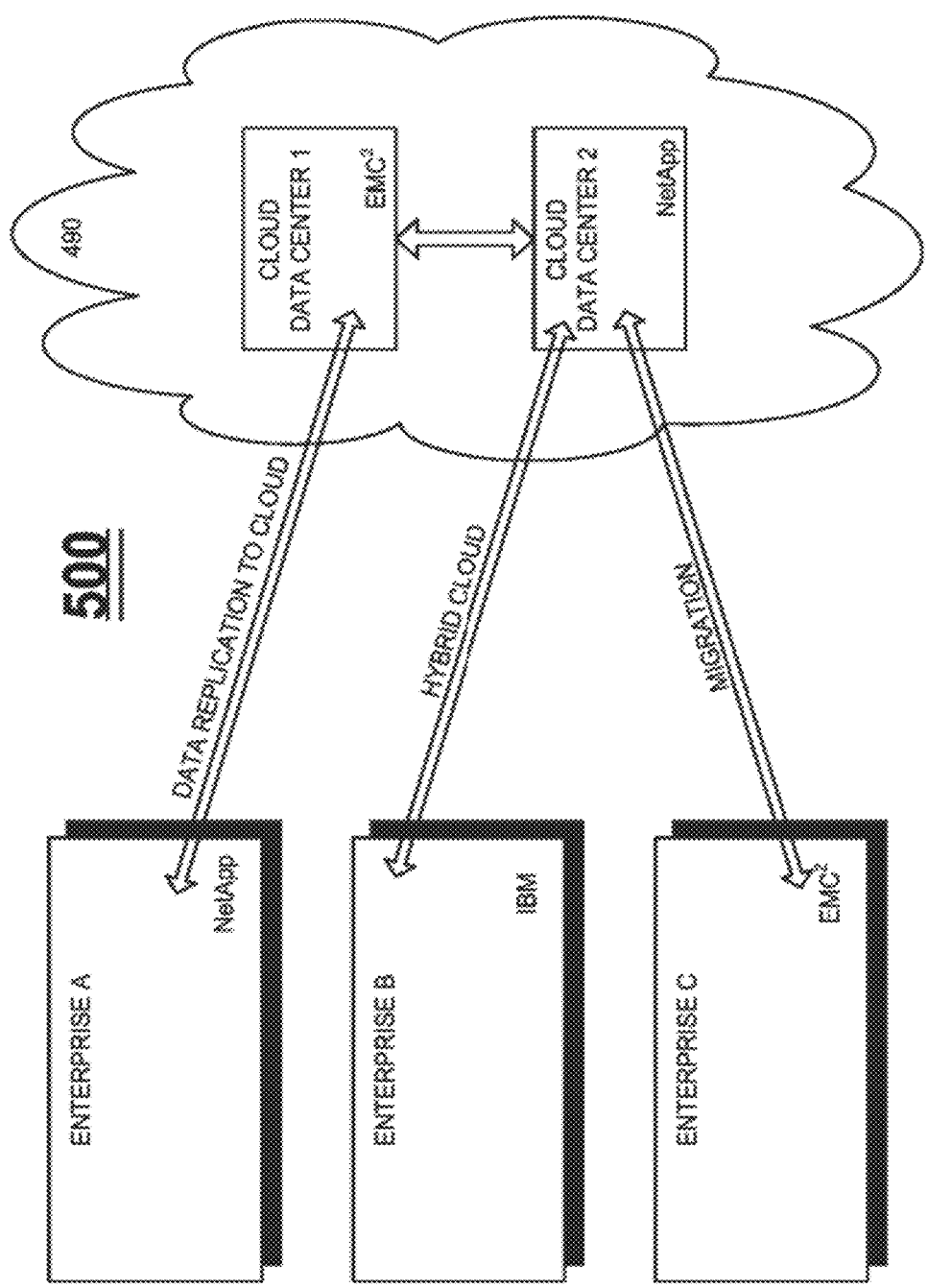
FIG. 8 is a simplified block diagram of a system for multi-tenant and multi-site cloud-based data services, in accordance with an embodiment of the present invention.

Cloud-based systems of the present invention overcome these weaknesses. Reference is made to FIG. 8, which is a simplified block diagram of a system 500 for mufti-tenant and mufti-site cloud-based data services, in accordance with an embodiment of the present invention. Shown in FIG. 8 are three enterprises, designated A, B and C, and a remote cloud-based facility 490 with two data centers, designated 1 and 2. Enterprise A uses a NETAPP data management system, Enterprise B uses an IBM data management system, and Enterprise C uses an $EMC^2$® data management system. Data Center 1 uses an $EMC^2$® data management system and services Enterprise A. Data Center 2 uses a NETAPP® data management system and services Enterprises B and C.

System 500 has many advantages over conventional data service systems. Inter alia, system 500 enables protection of heterogenic environments, enables remote control of enterprise sites, enables economies of scale, enables complete workload mobility, enables a complete web services API for seamless integration, and enables integration with other cloud-based management systems.

Figure 9:
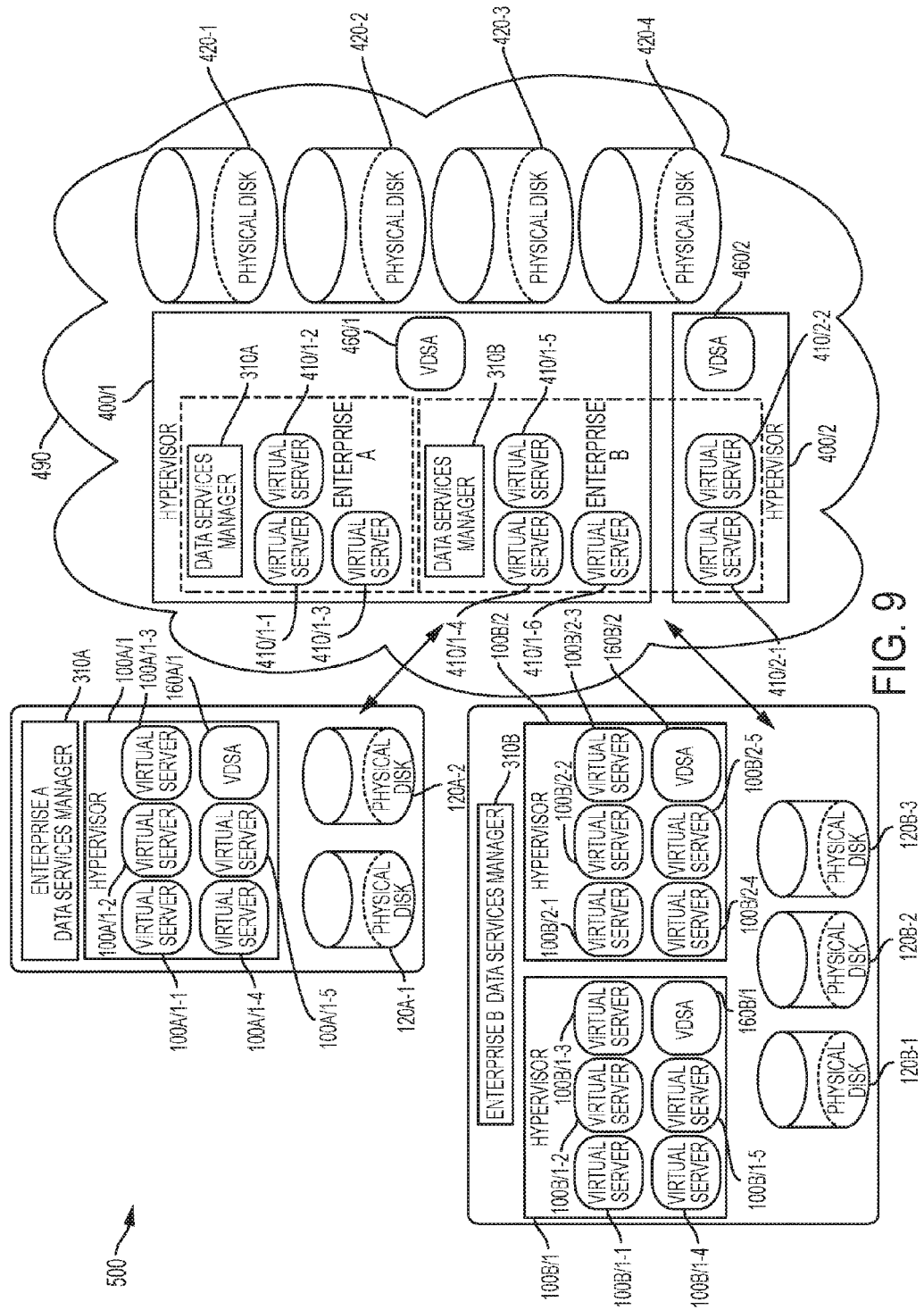
FIG. 9 is a simplified block diagram of a first architecture for providing hypervisor level mufti-tenant cloud-based data services, in accordance with an embodiment of the present invention.

Reference is made to FIG. 9, which is a simplified block diagram of a first architecture of system 500 for providing hypervisor level multi-tenant cloud-based data services, in accordance with an embodiment of the present invention. The architecture shown in FIG. 9 includes two enterprises; namely, a smaller enterprise A and a larger enterprise B. Enterprise A infrastructure includes a single hypervisor 100A/1 with five virtual servers 100A/1-1, 100A/1-2, 100A/1-3, 100A/1-4 and 100A/1-5 and a VDSA 160A/1, includes two physical disks 120A-1 and 120A-2, and includes a data services manager 310A. Enterprise B infrastructure includes two hypervisors 100B/1 and 100B/2, includes three physical disks 120B-1, 120B-2 and 120B-3, and a data services manager 3108. Hypervisor 100B/1 includes five virtual servers 100B/1-1, 100B/1-2, 100B/1-3, 100B/1-4 and 100B/1-5 and a VDSA 160B/1; and hypervisor 100B/2 includes five virtual servers 100B/2-1, 100B/2-2, 100B/2-3, 100B/2-4 and 100B/2-5 and a VDSA 160B/2.

Cloud-based facility 490 infrastructure includes two hypervisors 400/1 and 400/2, and four physical disks 420-1, 420-2, 420-3 and 420-4. Hypervisor 400/1 includes six virtual servers 410/1-1, 410/1-2, 410/1-3, 410/1-4, 410/1-5 and 410/1-6; and hypervisor 400/2 includes two virtual servers 410/2-1 and 410/2-2. Hypervisor 400/1 services Enterprises A and B, and hypervisor 400/2 services Enterprise B. As such, the infrastructure of cloud-based facility 490 is shared between Enterprises A and B.

The architecture of FIG. 9 allocates one data services manager per enterprise and one VDSA per hypervisor. Specifically, hypervisor 400/1 includes a VDSA 460/1 and hypervisor 400/2 includes a VDSA 460/2. A data services manager 510A services Enterprise A, and a data services manager 5108 services Enterprise B.

Figure 10:
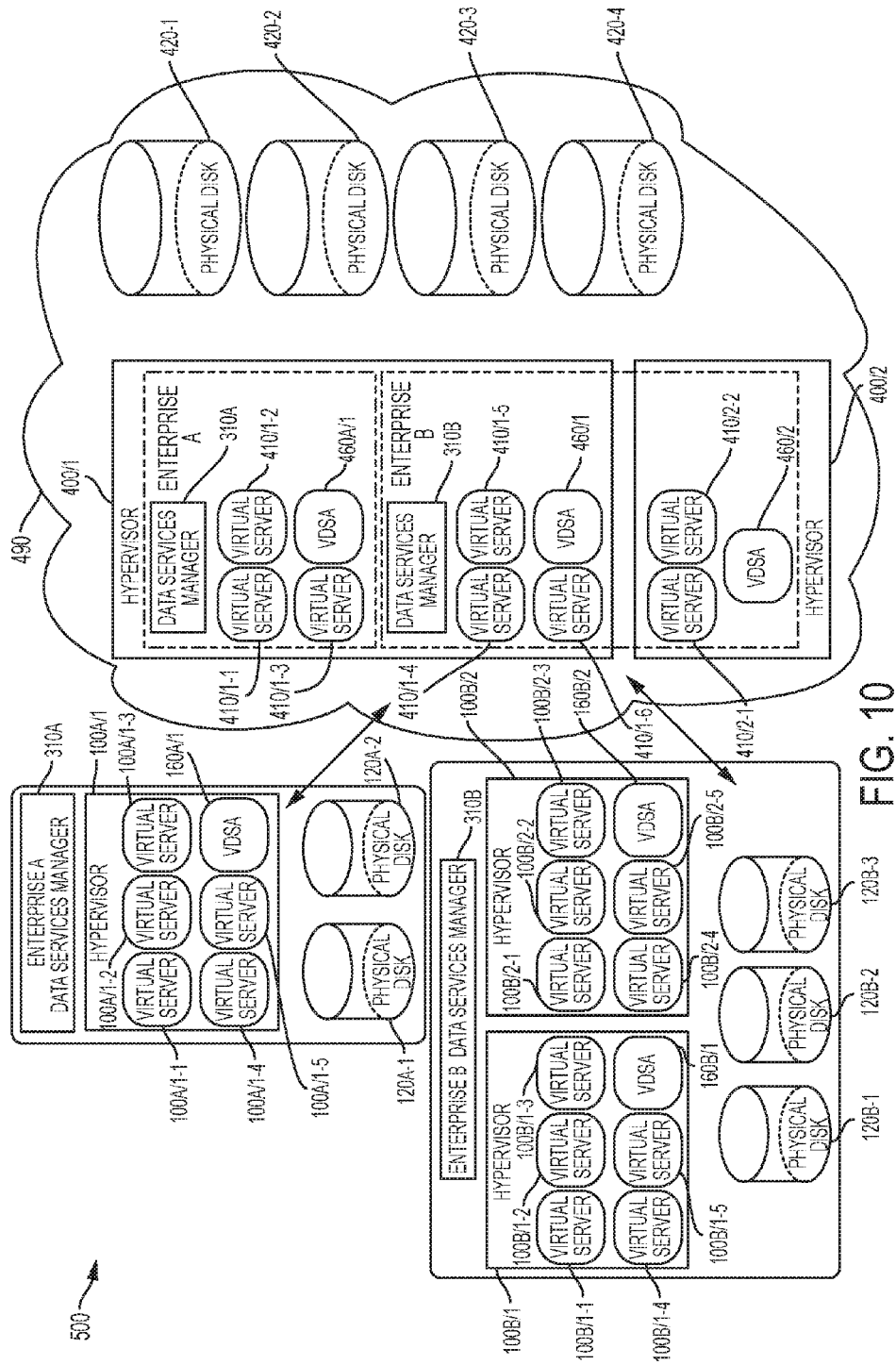
FIG. 10 is a simplified block diagram of a second architecture for providing hypervisor level mufti-tenant cloud-based data services, in accordance with an embodiment of the present invention.

Reference is made to FIG. 10, which is a simplified block diagram of a second architecture of system 500 for providing hypervisor level mufti-tenant cloud-based data services, in accordance with an embodiment of the present invention. The configuration of FIG. 10 allocates one data services manager per enterprise and one VDSA per enterprise per hypervisor. Specifically, hypervisor 400/1 includes a VDSA 460A/1 for Enterprise A and a VDSA 460B/1 for Enterprise B, and hypervisor 400/2 includes a VDSA 460B/2 for Enterprise B.

Figure 11:
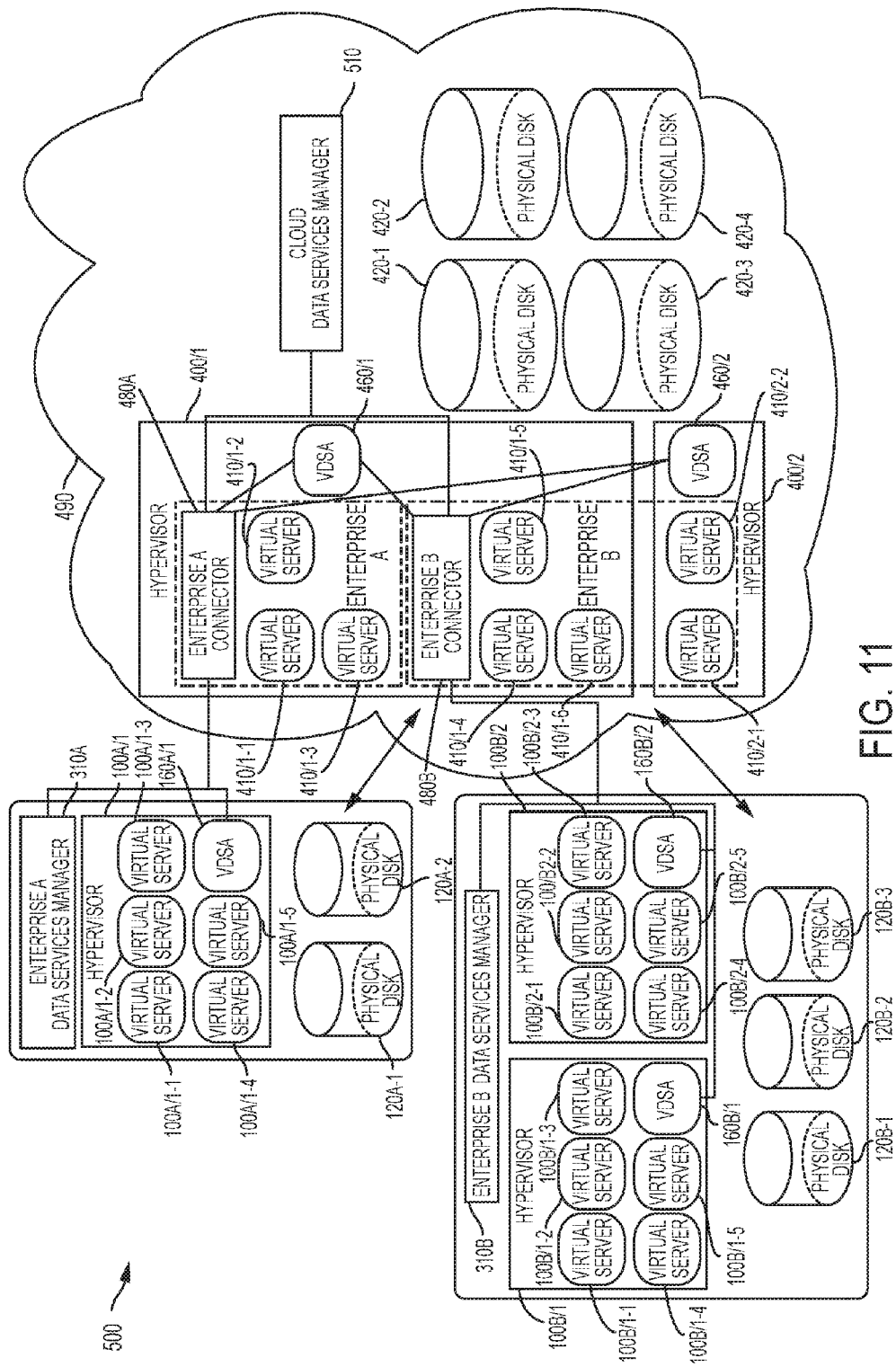
FIG. 11 is a simplified block diagram of a third architecture for providing hypervisor level mufti-tenant cloud-based data services, in accordance with an embodiment of the present invention.

Reference is made to FIG. 11, which is a simplified block diagram of a third configuration of system 500 for providing hypervisor level mufti-tenant cloud-based data services, in accordance with an embodiment of the present invention. The configuration of FIG. 12 allocates one data services manager in the cloud, and one VDSA per hypervisor. In addition, one enterprise connector is allocated per enterprise. Specifically, a connector 480A is allocated to Enterprise A, and a connector 480B is allocated to Enterprise B. Connector 480A is connected to both VDSA 460/1 and VDSA 460/2 and to a cloud data services manager 510 on the cloud side, and is connected to Enterprise A data services manager 310A and VDSA 160A/1 on the enterprise side. Similarly, connector 480B is connected to VDSA 460/1, VDSA 460/2 and cloud data services manager 510 on the cloud side, and is connected to Enterprise B data services manager 310B, VDSA 160B/1 and VDSA 160B/2 on the enterprise side. As such, each enterprise is connected to the entire infrastructure on the cloud side via its own connector.

Figure 12:
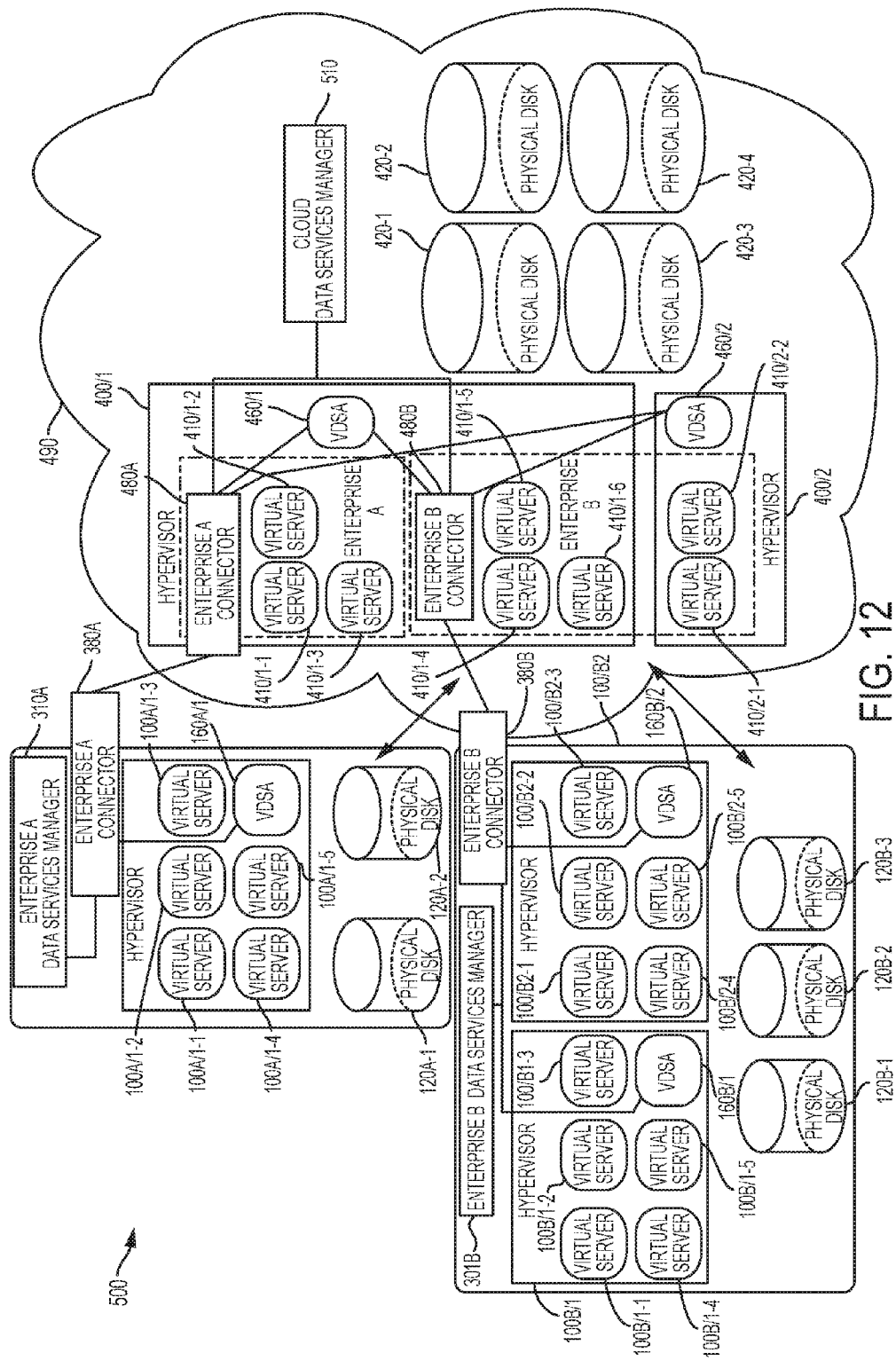
FIG. 12 is a simplified block diagram of a fourth architecture for providing hypervisor level mufti-tenant cloud-based data services, in accordance with an embodiment of the present invention.

Reference is made to FIG. 12, which is a simplified block diagram of a fourth architecture of system 500 for providing hypervisor level mufti-tenant cloud-based data services, in accordance with an embodiment of the present invention. The architecture of FIG. 12 also allocates one data services manager in the cloud, and one VDSA per hypervisor. In addition, one enterprise connector is allocated per enterprise. Connectors 480A and 480B on the cloud side are paired with respective connectors 380A and 380B on the enterprise side. Use of connectors 380A and 380B eliminates the need for a virtual private network (VPN), and enables installation of system 500 behind network address translators (NATs).

The different architectures in FIGS. 9-12 offer different advantages. The architecture of FIG. 9 minimizes the cloud footprint of the VDSA, by using a shared VDSA per hypervisor, and only one data services manager per enterprise. Specifically, the VDSA is shared between enterprises and security is enforced via the data services managers. In this architecture, the data services manager is duplicated per enterprise and centralized cloud management is lacking.

The architecture of FIG. 10 maximizes data path security for enterprises, but the cloud footprint is larger, since multiple data services managers may be required per hypervisor.

The architectures of FIGS. 11 and 12 provides data security, network security, minimal cloud footprint, and single point of control for cloud vendors. In this architecture, there is only one centralized data service manager on the cloud side, and only one VDSA per hypervisor. One cloud connector element is deployed on the cloud side, per enterprise. The cloud connector securely routes enterprise traffic from the enterprise network to the cloud infrastructure replication network, thus providing full network security and deployment features, including inter alia duplicate IP range utilization for different enterprises while maintaining unique network deployment on the cloud infrastructure side. The data services manager and VDSA's perform secure site authentication and data security, for end-to-end secure mufti-tenant service.

As such, it will be appreciated by those skilled in the art that the cloud-based hypervisor level data services systems of the present invention enable multi-tenancy and multi-site services. I.e., multiple enterprises and multiple sites may be serviced by the same physical infrastructure including inter alia the same hypervisors and storage, with minimized footprint on the cloud side, allowing for centralized cloud management. By providing each enterprise with its own data services manager on the clod side, as in FIGS. 9 and 10, or alternatively with its own connector and a centralized data services manager on the cloud side, as in FIGS. 11 and 12, the systems of the present invention provide path separation between enterprises, thus ensuring that each enterprise is only able to view and access his own virtual servers and storage, and each enterprise can only control its own data replication.

By deploying additional cloud connectors on the enterprise side, as in FIG. 12, the systems of the present invention may be installed behind NATs, and do not require a VPN. As such, these systems may obviate VPN setups for enterprises, and obviate use of dedicated public IPs. For additional security, the cloud connectors encrypt traffic, thus eliminating the need for additional network security elements.

The systems of the present invention provide bi-directional cloud-based data replication services; i.e., from an enterprise to the cloud, and from the cloud to an enterprise, for the same enterprise or for different enterprises, simultaneously using the same shared infrastructure. Moreover, replication targets may be set as resources that do not expose the enterprise infrastructure, thus providing an additional layer of security and privacy between enterprises.

It will be appreciated by those skilled in the art that systems of the present invention may be used to enforce jurisdictional data export regulations. Specifically, cloud-based facility 490 infrastructure is partitioned according to jurisdictions, and data recovery and failover for an enterprise is limited to one or more specific partitions according to jurisdictional regulations.

Figure 13:
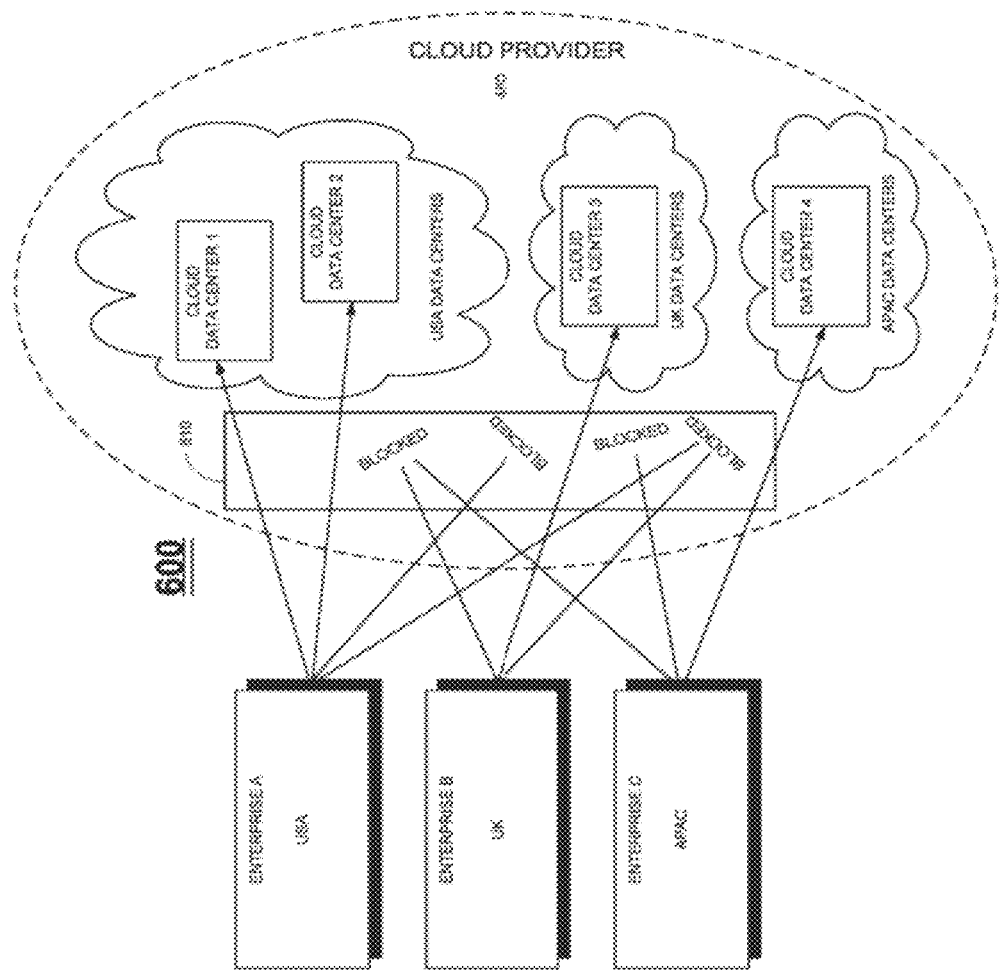
FIG. 13 is a simplified block diagram of a system for multi-tenant and mufti-site cloud-based data services with jurisdictional data separation, in accordance with an embodiment of the present invention.

Reference is made to FIG. 13, which is a simplified block diagram of a system 600 for mufti-tenant and mufti-site cloud-based data services with jurisdictional data separation, in accordance with an embodiment of the present invention. Shown in FIG. 13 are three jurisdictional enterprises; namely, a USA Enterprise A, a UK Enterprise B, and an APAC Enterprise C. Also shown in FIG. 13 are four data centers; namely, Data Center 1 and Data Center 2 in the USA, Data Center 3 in the UK and Data Center 4 in APAC.

Privacy and data security regulations prevent data from being exported from one jurisdiction to another. In order to enforce these regulations, system 600 includes a rights manager 610 that blocks access to a data center by an enterprise if data export is regulations restrict data transfer between their respective jurisdictions. Thus rights manager 610 blocks access by Enterprise A to Data Centers 3 and 4, blocks access by Enterprise B to Data Centers 1,2 and 4, and blocks access by Enterprise C to Data Centers 1, 2, and 3. Enterprises A, B and C may be commonly owned, but access of the data centers by the enterprises is nevertheless blocked, in order to comply with data export regulations.

In accordance with an embodiment of the present invention, when configuring a virtual protection group, an administrator may set a territory/data center restriction. When the administrator subsequently selects a destination resource for data replication for a virtual protection group, system 600 verifies that the resource is located in a geography that does not violate a territory/data center restriction.

The present invention provides built-in test capabilities, which enable an administrator to run multiples tests in parallel, to test recovery of data to multiple points in time. When a desired previous point in time is selected for testing by a disaster recovery system, each disk image is presented to the enterprise data applications, as the disk's data existed at the desired point in time. The data in the disk image corresponding to the desired point in time is generally determined from a replica disk and from an undo log of write commands. The replica disk generally corresponds to a disk image at a time later than the desired point in time. Some of the data in the replica disk may have been written prior to the desired point in time and some of the data may have been written subsequent to the desired point in time. For addresses to which data was written subsequent to the desired point in time, the undo journal may be used to undo the writes from the replica disk back to the desired point in time, to determine the disk image at the desired point in time. For addresses to which data was not written subsequent to the desired point in time, the data from the replica disk is used to determine the disk image at the desired point in time.

During recovery testing, all reads from a disk are directed to the disaster recovery system, which responds to the reads by providing the data for the disk image corresponding to the desired point in time. All writes to disks are recorded in a separate write log, so as to be able to erase them after the test is complete, thereby ensuring that production data is not affected by the recovery test.

There are many advantages to testing a previous point in time disk image, including ensuring that a replica is usable, and finding a safe point in time for recovery prior to a disaster.

The present invention enables running multiple recovery tests in parallel, at multiple points in time. When multiple points in time are selected for multiple tests, each test is redirected through a different processing stack, which reads data according to the appropriate point in time. Each test has its own write log. Each test may be stopped independently of the other tests. When a test is stopped, the test ends and is summarized and marked as pass or fail.

Figure 14:
FIG. 14 is a user interface screenshot for initiating recovery tests for multiple points in time, in accordance with an embodiment of the present invention.

Reference is made to FIGS. 14-18, which are user interface screenshots of multiple points in time recovery testing, in accordance with an embodiment of the present invention. Shown in FIG. 14 is a user interface for performing recovery tests for multiple points in time, in accordance with an embodiment of the present invention. Clicking on the "Failover" control, marked with a circled 1, causes the recovery tests to be performed.

Figure 15:
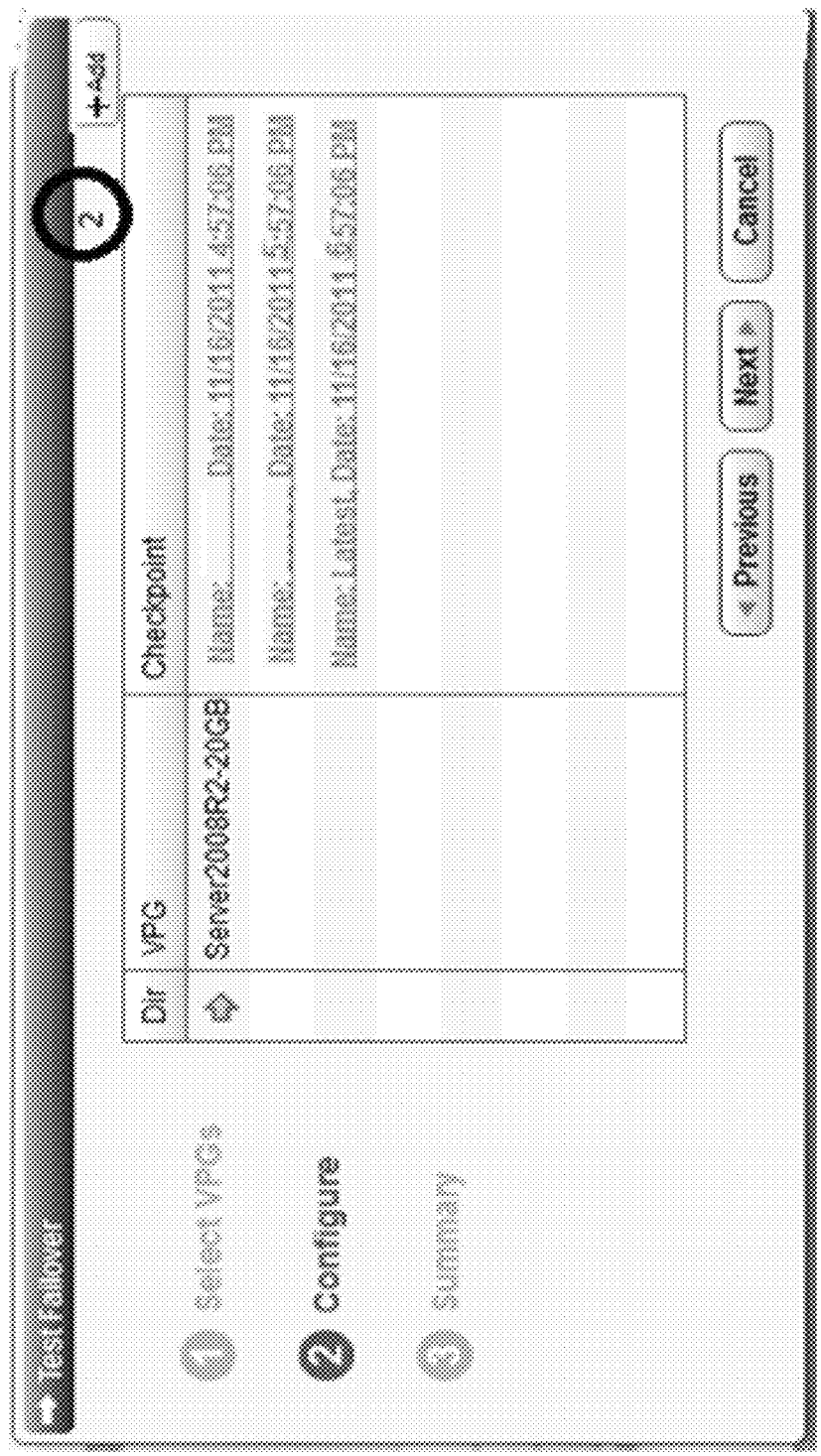
FIG. 15 is a user interface screenshot for configuring the multiple points in time, in accordance with an embodiment of the present invention.

Shown in FIG. 15 is a user interface for configuring the multiple points in time, in accordance with an embodiment of the present invention. FIG. 15 shows three recovery tests to be run in parallel for virtual protection group "Server2008R2-20G8", for disk images at respective previous points in times 4:57:06 PM, 5:57:06 PM and 6:57:06 PM on Nov. 16, 2011.

Figure 16:
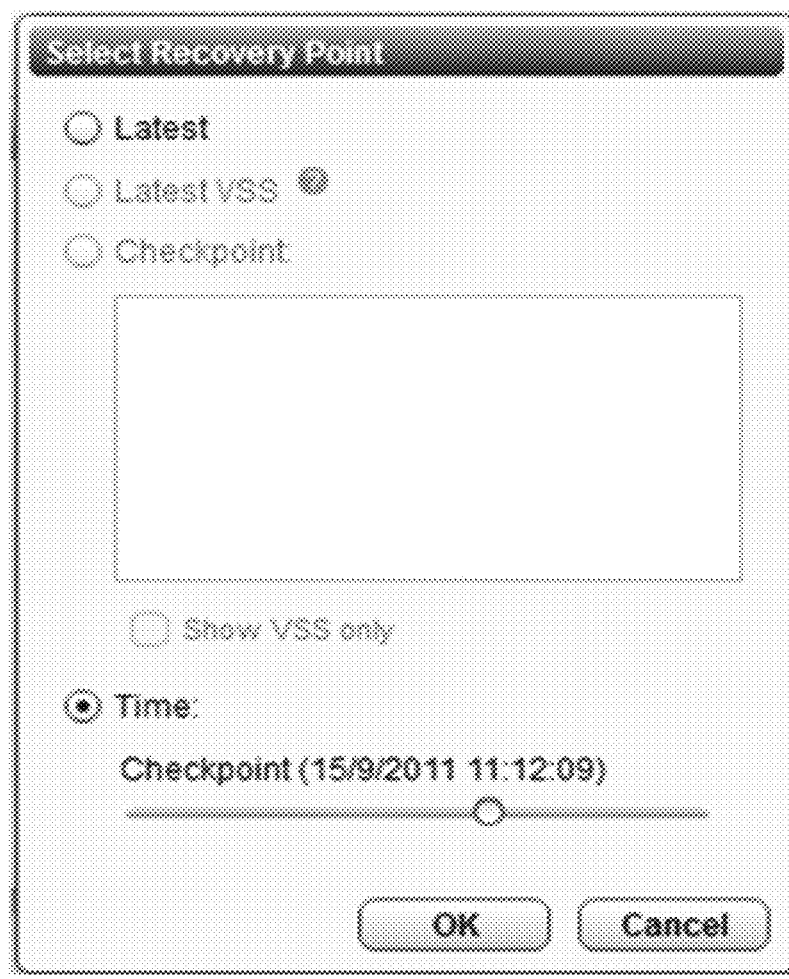
FIG. 16 is a user interface screenshot for designating a specific one of the multiple points in time, in accordance with an embodiment of the present invention.

Clicking on the "+Add" control, marked with a circled 2, causes the window shown in FIG. 16 to appear, for adding an additional point in time for testing data recovery.

Shown in FIG. 16 is a user interface for designating a specific one of the multiple points in time, in accordance with an embodiment of the present invention.

Figure 17:
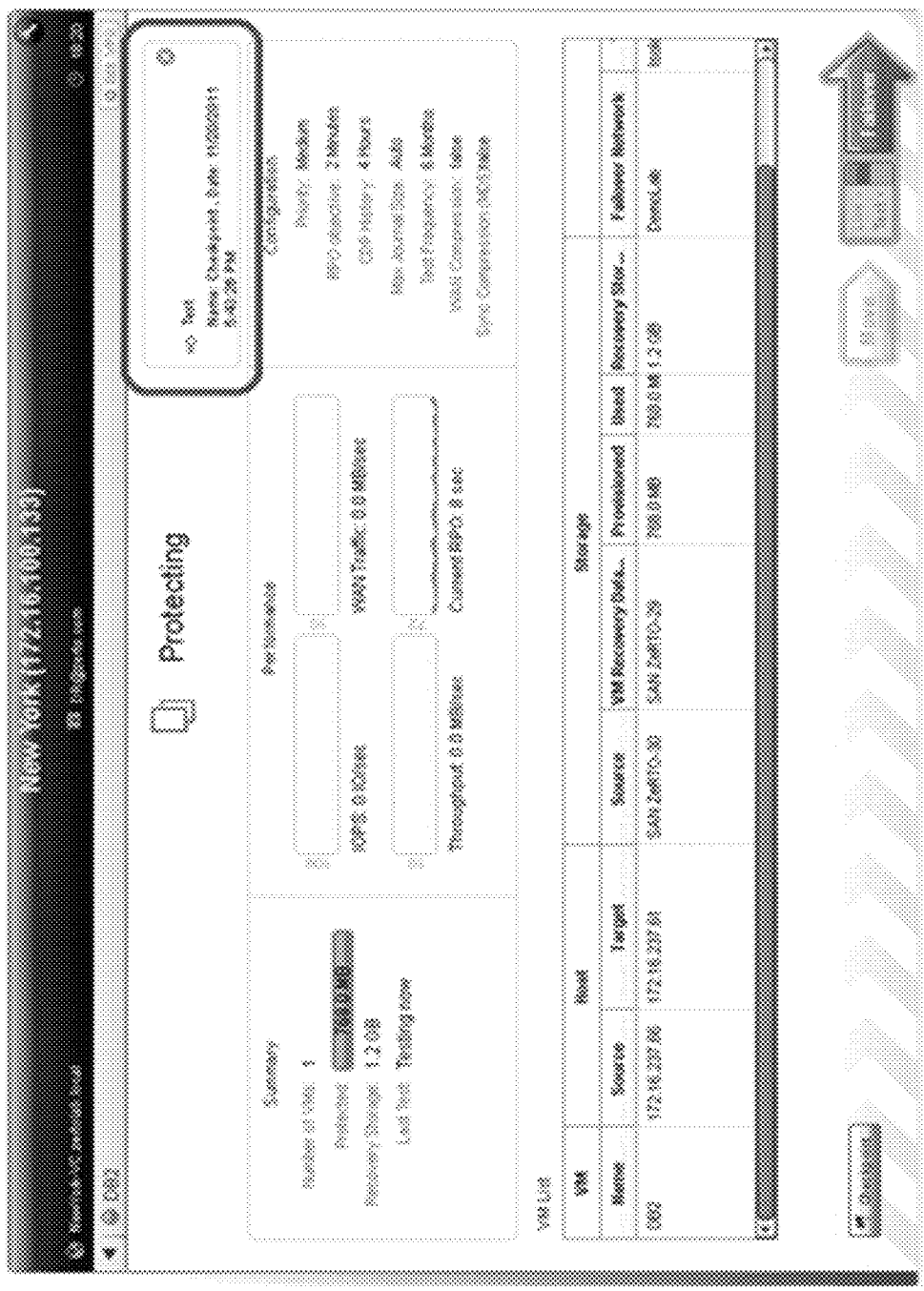
FIG. 17 is a user interface screenshot for stopping one or more of the recovery tests, in accordance with an embodiment of the present invention.

Shown in FIG. 17 is a user interface for stopping one or more of the recovery tests, in accordance with an embodiment of the present invention. Clicking on the "X" within the outlined area at the top right causes a test to stop, thereby ending the test.

Figure 18:
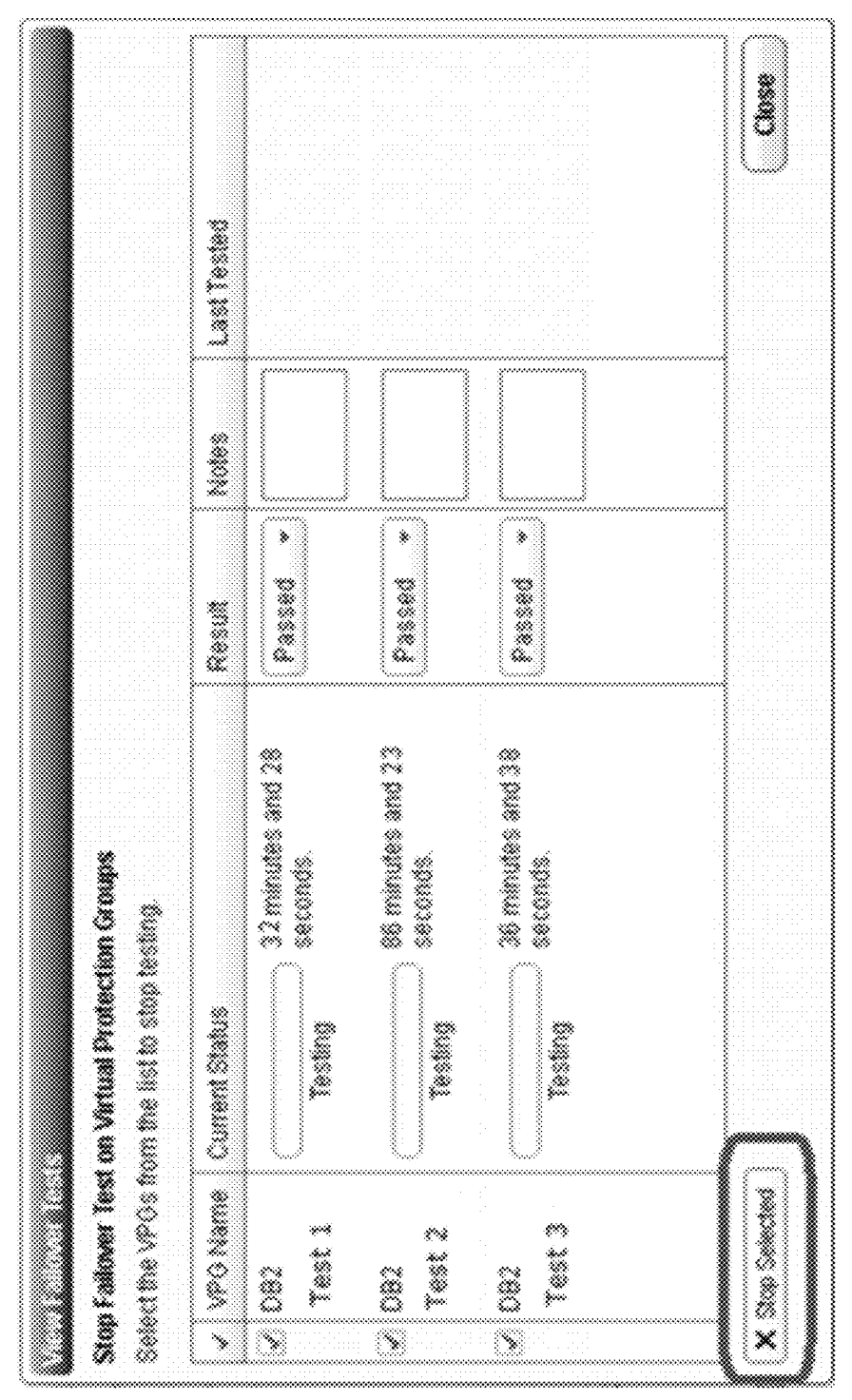

Shown in FIG. 18 is a user interface with a summary of the recovery tests, including the times at which the tests were stopped, in accordance with an embodiment of the present invention. FIG. 18 indicates that three tests were run, and stopped after respective times 32 minutes and 28 seconds, 86 minutes and 23 seconds, and 36 minutes and 38 seconds. All three tests passed.

Figure 19:
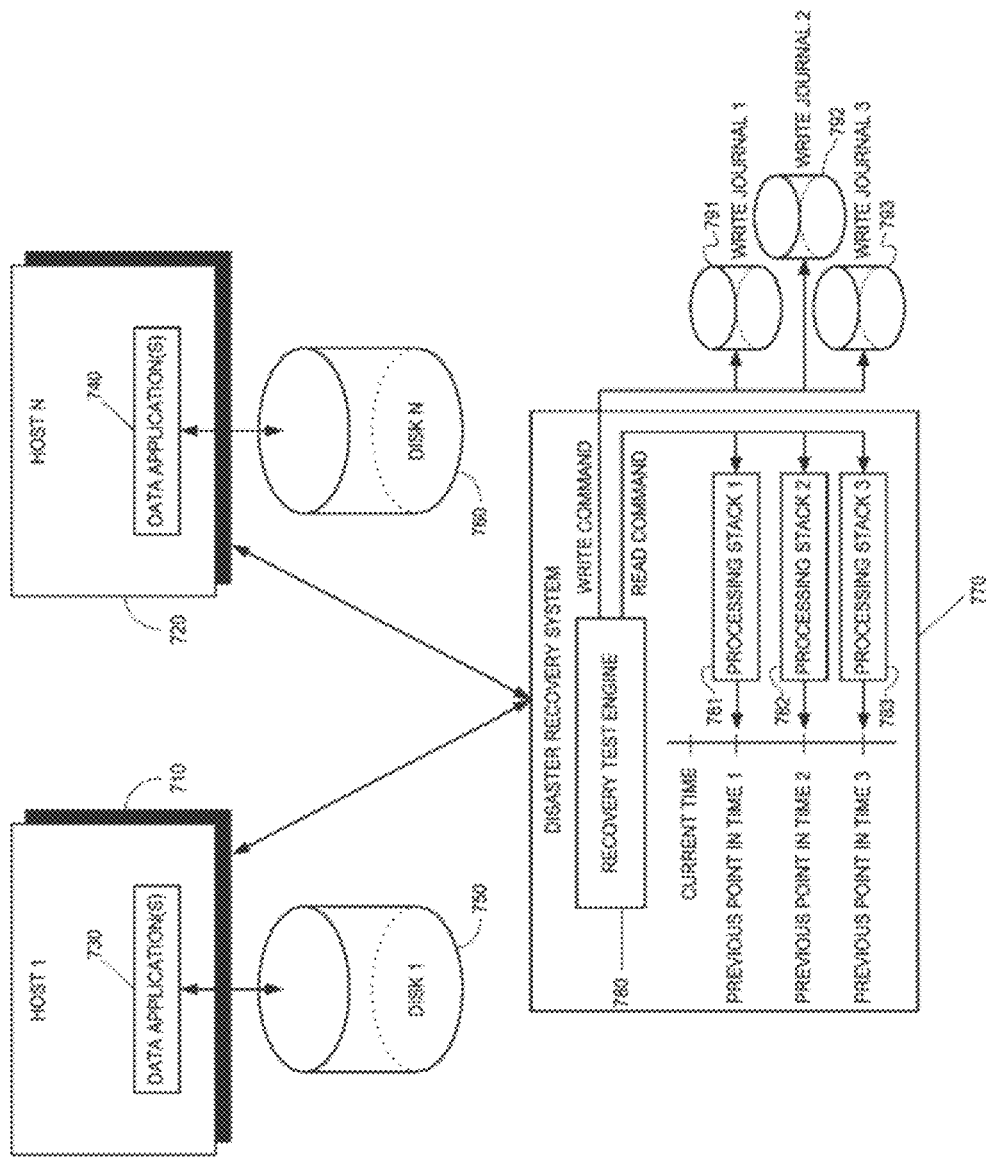
FIG. 19 is a simplified block diagram of a multiple point in time disaster recovery system, in accordance with an embodiment of the present invention.

Reference is made to FIG. 19, which is a simplified block diagram of a multiple points in time disaster recovery system, in accordance with an embodiment of the present invention. Shown in FIG. 19 are host sites 710 and 720 running respective data processing applications 730 and 740, which read data from and write data to respective disks 750 and 760. Disks 750 and 760 may be shared disks among the hosts.

A data recovery system 770 includes a recovery test engine 780, which enables simultaneous recovery testing of images of disks 750 and 760 at multiple points in time. As shown in FIG. 18, three tests are run simultaneously, corresponding to three respective previous points in time. In accordance with an embodiment of the present invention, recovery test engine 780 generates in parallel processing stacks 781, 782 and 783 for the three respective tests, each processing stack corresponding to one of the points in time at which the disk images are being recovered.

Processing stacks 781, 782 and 783 are each operative to receive a read command for a data address in one of the disks 750 and 760 issued by a data application, and to return data for the data address in the disk image as it existed at the point in time corresponding to the stack.

Recovery test engine 780 is operative to receive a write command for a data address in one of the disks 750 and 760, and log the write command in a temporary write journal 791, 792 or 793 corresponding to the point in time being tested. The write journals 791, 792 and 793 are generally discarded at the end of the recovery tests, thus ensuring that the recovery tests do not affect production data.

Figure 20:
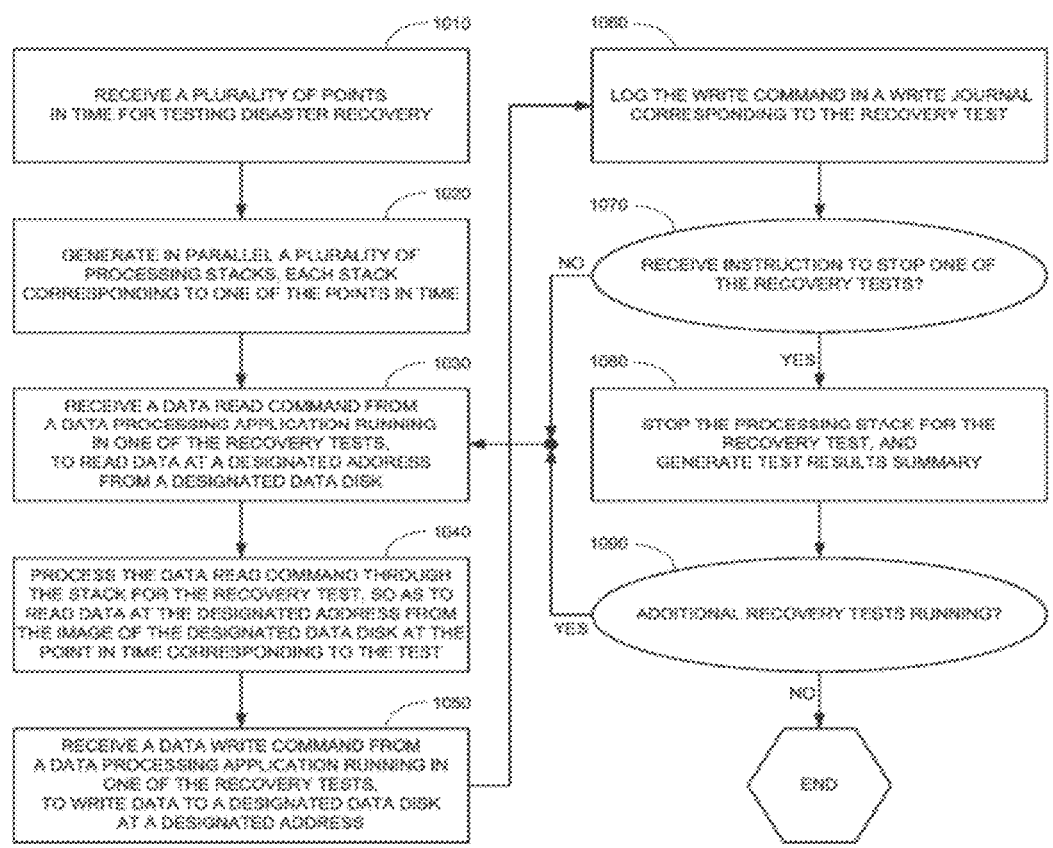
FIG. 20 is a simplified flowchart of a method for multiple points in time disaster recovery, in accordance with an embodiment of the present invention.

Reference is made to FIG. 20, which is a simplified flowchart of a method for multiple points in time disaster recovery, in accordance with an embodiment of the present invention. At operation 1010 a plurality of points in time, at which to perform a plurality of disaster recovery tests, are received. The points in time are generally designated by an administrator of a disaster recovery system. The recovery tests are operative to roll back data corresponding to disk images at the plurality of points in time, in order to check their suitability for safe recovery in case of a disaster.

At operation 1020 a plurality of processing stacks, such as processing stacks 781, 782 and 783 (FIG. 19) are generated in parallel, each processing stack corresponding to one of the points in time.

At operation 1030 a read command to read data at a designated address from a designated data disk, is received from a data processing application for one of the recovery tests. At operation 1040 the processing stack corresponding to the recovery test returns data at the designated address corresponding to the image of the designated disk at the point in time being tested.

At operation 1050 a write command to write data in a designated address of a designated data disk, is received from a data processing application for one of the recovery tests. At operation 1050, the write command is logged into a write journal used specifically for the recovery test, such as one of the write journals 791, 792 and 793.

At operation 1070 a determination is made if an instruction to stop one of the recovery tests is received. If not, then the method returns to operation 1030, to continue processing read and write commands. If so, then the processing stack for the recovery test is stopped at step 1080, thereby ending the test, and a summary of test results is generated. In one embodiment of the present invention, the summary is provided through the FailoverTestInfo data object listed in Appendix III.

At step 1090 a determination is made whether any remaining recovery tests are running. If so, the method returns to operation 1030 to continue processing read and write commands for the remaining recovery tests being performed. If not, then all tests have been stopped and the method ends.

It will thus be appreciated that the present invention enables parallel recovery testing of disk images at multiple points in time, thereby saving time and resources in performing multiple recovery tests vis-à-vis conventional recovery systems.

The present invention may be implemented through an application programming interface (API), exposed as web service operations. Reference is made to Appendices I-V, which define an API for virtual replication web services, in accordance with an embodiment of the present invention. The API for recovery tests for virtual protection groups is provided in Appendix III.

It will thus be appreciated that the present invention provides many advantages, including inter alia:
  heterogeneous hypervisor replication, for different types of sources and target hypervisor; e.g., from a VMWare hypervisor to a Xen hypervisor;
  heterogeneous storage replication, for different types of storage systems; e.g., from an EMC storage system to a NetApp storage systems;
  bi-directional replication, whereby one enterprise may replicate from the enterprise to a cloud data center, while another enterprise simultaneously replicates from a cloud data center back to the enterprise; and
  security, whereby the cloud infrastructure is not exposed.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

APPENDIX I

Site Controller Web Services
  These web services include methods and properties for pairing and un-pairing sites, and for managing site details.
Properties
  PeerSiteIdentifier
  This property is a globally unique identifier for the peer site of a given site.
  SiteConnectionParameters
  This property includes parameters to access a site, including
    string Hostname—the host name or IP address of the site; and
    int Port—the port for the virtual data services appliances at the site.
  SiteIdentifier
  This property is a globally unique identifier for a site.
  SiteManagementDetails
  This property includes a name, location and contact information for a site, including
    string ContactInfo—the information used to contact an administrator in case recovery is required;
    string Location—the location of the site; and
    string SiteName—the name of the site.
  ThisSiteIdentifier
  This property indicates the globally unique identifier for the local site.
Methods
  GetPeerConnectionParameters
  public SiteConnectionParameters Get PeerConnectionParameters( )
  This method retrieves the IP address and port of the site paired with a given site.
  GetSiteDetails
  public SiteDetails GetSiteDetails(SiteIdentifier siteIdentifier)
  This method retrieves site details, including inter alia the IP address and port of a designated server.
  GetSiteManagementDetails
  public SiteManagementDetails GetSiteManagementDetails (SiteIdentifier siteIdentifier)

This method retrieves the name, location and contact information specified by an administrator for a designated site.

GetSiteMappings public IEnumerable<SiteMapping>GetSiteMappings( )

This method retrieves the identifiers for a site and for its paired site.

Get TcpPort public int GetTcpPort(SiteIdentifier siteIdentifier)

This method retrieves the TCP port to access the virtual data services application for a designated site.

GetUsername public string GetUsername( )

This method retrieves the username for a hypervisor.

GetIP public string GetIP( )

This method retrieves the IP address or a hostname for a hypervisor.

IsPaired public bool IsPaired( )

This method returns true if the local site is paired with another site. Otherwise, it returns false.

Pair public void Pair(SiteConnectionParameters peerConnectionParameters)

This method pairs a local site with another site.

Reconfigure public void Reconfigure( String hostname, String username, String password)

This method reconfigures hypervisor information.

SetTcpPort public int SetTcpPort(SiteIdentifier siteIdentifier, int port)

This method sets the TCP port used to access the virtual data services appliances at a designated site.

Unpair public void Unpair( )

This method un-pairs a local and remote site.

APPENDIX II

Host Controller Web Services

These web services include methods and properties to identify hypervisors, and to deploy virtual data services appliances on hypervisors.

Properties

HostIdentifier

This property identifies a hypervisor, and includes string InternalHostName—a name used to identify the hypervisor; and ServerIdentifier serverIdentifier—the globally unique identifier for the hypervisor.

Methods

GetCurrentlyInstallingHosts public HostIdentifier GetCurrentlyInstallingHosts(SiteIdentifier siteIdentifier)

This method retrieves a list of hypervisors where a virtual data services appliance is in the process of being installed, at a designated site.

GetCurrentlyRemovingHosts public HostIdentifier GetCurrentlyRemovingHosts (SiteIdentifier siteIdentifier)

This method retrieves a list of hypervisors where a virtual data services appliance is in the process of being un-deployed, at a designated site.

GetInstalledHosts public HostIdentifier GetInstalledHosts(SiteIdentifier siteIdentifier)

This method retrieves a list of hypervisors where a virtual data services appliance is installed, at a designated site.

GetUninstalledHosts public HostIdentifier GetUninstalledHosts(SiteIdentifier siteIdentifier)

This method retrieves a list of hypervisors where a virtual data services appliance is not installed, at a designated site.

InstallVdsaOnHost public CommandTaskIdentifier InstallVdsaOnHost( SiteIdentifier siteIdentifier, HostIdentifier hostIdentifier, DatastoreIdentifier datastoreIdentifier, NetworkIdentifier networkIdentifier, VdsaIpConf vdsaIpConf)

This method deploys a virtual data services appliance on a specified hypervisor at a designated site, in accordance with a specified datastore, a specified type of network, and access details including inter alia an IP a subnet mask and gateway for the VDSA.

UninstallVdsaFromHost public void UninstallVdsaFromHost(SiteIdentifier siteIdentifier, HostIdentifier hostIdentifier)

This method un-deploys a virtual data services appliance from a specified hypervisor, at a designated site.

APPENDIX III

Protection Group Controller Web Services

These web services include methods and properties to manage virtual protection groups.

Properties

Checkpoint

This property identifies a checkpoint by an unsigned integer.

FailoverTestInfo

This property includes information returned from a failover test, including

DateTime StartTime—The time the test started, represented as a date and time of day;

DateTime EndTime—The time the test ended, represented as a date and time of day;

TestStatus Status—A status of the test, including Unknown, FailedBySystem, AbortedByFailoverCommand, AbortedBySystem, FailedByUser, Success, CurrentlyRunning;

string Summary—a summary of the test;

string AttachmentName—a name of an attachment; and byte[ ] Attachment—a key to an attachment.

ProtectionGroupIdentifier

This property is a globally unique identifier for a virtual protection group.

ProtectionGroupManagementSettings

This property defines settings for a protection group, including

ProtectionGroupSettings—properties for a protection group;

vAppManagementSettings—properties for a virtual application, when the virtual protection group protects a virtual application; and VSManagementSettings—properties for the virtual server.

ProtectionGroupSettings

This property defines settings for a virtual protection group, including string Name—a name used to identify the virtual protection group;

unsigned int RpoInSeconds—the maximum number of seconds between checkpoints;

unsigned long LogVolumeMaxSizeInSectors—the maximum log size;

unsigned int LogBacklogInMinutes—the time during which log entries are kept in cache;
bool UseCompression—set to true if data should be compressed when transmitted to the peer site;
ProtectionGroupDefaults Defaults—defaults used to identify the recovery site, including the IP address of the hypervisor host, the name of the datastore, and the networks to use for tests and for failovers
ProtectionGroupPriority Priority—the priority assigned to the virtual protection group; namely, Low, Medium or High;
int RemoteId—the identifier assigned to the peer site; and
int MaxTestIntervalInMinutes—the maximum time, in minutes, between tests.
ProtectionGroupStatus
This property indicates the status of a virtual protection group, from among Protecting, NeedReverseConfiguration, Promoting, PromotingAndNeedReverseConfiguration, Test, Failover, PromotionCompleteMirrorsNotYetActivated, MissingConfiguration, PromotingAndMissingConfiguration, RemoveInProgress.
vAppManagementSettings
This property indicates settings for a virtual application, including
  vAppIdentifier
    string InternalVAppName—a name for the virtual application; and
    ServerIdentifier serverIdentifier—a globally unique identifier for the virtual application; and
  vAppSettings
    string InternalName—a name of the virtual application replication destination;
    ServerIdentifier serverIdentifier—a globally unique identifier for the virtual application replication destination; and
    Type—the type of server hosting the virtual application at the destination; namely, host(0) or cluster(1).
VSManagementSettings
This property indicates settings for a virtual server, including
  VSIdentifier
    string InternalVSName—a name given to the virtual server; and
    ServerIdentifier serverIdentifier—a globally unique identifier for the virtual server;
  VSSettings
    ReplicationDestination—the destination name, identifier and type (host/cluster) and the datastore name and identifier; and
    VSDestinationFolders—a failover destination folder and a failover test destination folder, including a name and an identifier;
    VNicManagementSettingsCollection—virtual NIC settings; and
    VolumeManagementSettings—settings that identify a volume, such as the directory, path and name of the disk and type of disk, such as a raw drive, and whether or not it is a swap disk.
Methods
bCheckpointsExist
public bool bCheckpointsExist(ProtectionGroupIdentifier identifier)
This method returns true if checkpoints exit for a designated virtual protection group.

ClearSite
public CommandTaskIdentifier ClearSite(SiteIdentifier site)
This method removes the virtual protection groups defined at a designated site.
CreateProtectionGroup
public CommandTaskIdentifier CreateProtectionGroup(ProtectionGroupManagementSettings managementSettings SiteIdentifier siteIdentifier)
This method creates a virtual protection group at a designated site.
FailOver
public CommandTaskIdentifier FailOver(ProtectionGroupIdentifier identifier, CheckpointIdentifier checkpoint, ProtectionGroupManagementSettings postFailoverSettings)
This method performs a failover of the virtual servers in a designated virtual protection group, to a designated checkpoint instance or to the latest checkpoint.
FailOverTest
public CommandTaskIdentifier FailOverTest(ProtectionGroupIdentifier identifier, CheckpointIdentifier checkpoint)
This method performs a failover of the virtual servers in a designated virtual protection group, to a designated checkpoint or to the latest checkpoint, without creating reverse replication and without stopping protection of the virtual servers in the designated virtual protection group.
ForceRemoveProtectionGroup
public CommandTaskIdentifier ForceRemoveProtectionGroup(ProtectionGroupIdentifier identifier)
This method removes a virtual protection group irrespective of the state of the group. This method is used if the RemoveProtectionGroup method is unable to complete successfully.
ForceUpdateProtectionGroup
public CommandTaskIdentifier ForceUpdateProtectionGroup(ProtectionGroupIdentifier identifier, ProtectionGroupManagementSettings managementSettings)
This method updates virtual protection group settings, including removal of virtual servers and disks that should have been removed using the RemoveProtectionGroup method. This method is used if the UpdateProtectionGroup method is unable to complete successfully.
GetCheckpointList
public List<Checkpoint> GetCheckpointList(ProtectionGroupIdentifier identifier)
This method retrieves a list of checkpoints for a specified virtual protection group.
GetFailOverTestInfo
public List<FailoverTestInfo> GetFailoverTestInfo(ProtectionGroupIdentifier identifier, int numOfTests)
This method retrieves information about failover tests for a specified virtual protection group.
GetProtectionGroupDefaultReverseSettings
public ProtectionGroupManagementSettings GetProtectionGroupDefaultReverseSettings(ProtectionGroupIdentifier identifier)
This method retrieves the virtual protection group settings for a specified virtual protection group, for use as default values for reverse replication.
GetProtectionGroupManagementSettings
public ProtectionGroupManagementSettings GetProtectionGroupManagementSettings(ProtectionGroupIdentifier identifier)
This method retrieves the settings for a designated virtual protection group.

GetProtectionGroups
public IEnumerable<ProtectionGroupIdentifiers> GetProtectionGroups( )
This method retrieves a list of virtual protection groups.
GetProtectionGroupState
public ProtectionGroupState GetProtectionGroupState(ProtectionGroupIdentifier identifier)
This method retrieves the state of a specified virtual protection group, the state being "protected" or "recovered". If the group is protected, 0 is returned; and if the group is recovered, 1 is returned.
GetProtectionGroupStatus
public ProtectionGroupStatus GetProtectionGroupStatus (ProtectionGroupIdentifier identifier)
This method retrieves the status of a specified virtual protection group, the status being inter alia "protecting", "testing" or "promoting".
InsertTaggedCheckpoint
public CommandTaskIdentifier InsertTaggedCheckpoint (ProtectionGroupIdentifier identifier, string tag)
This method inserts a named checkpoint for a designated virtual protection group. The method returns immediately, without verifying whether or not the checkpoint was successfully written to the journal in the peer site.
IsPairConnected
public bool IsPairConnected( )
This method returns true if the connection to the paired site is up.
Move
public ComamndTaskIdentifier Move(ProtectionGroupIdentifier identifier, ProtectionGroupManagementSettings postMoveSettings)
This method migrates a specified virtual protection group to the peer site.
ProtectVS
public CommandTaskIdentifier ProtectVS(ProtectionGroupIdentifier identifier, VSManagementSettings vsManagementSettings)
This method adds a designated virtual server to a virtual protection group, in accordance with designated settings.
RemoveProtectionGroup
public CommandTaskIdentifier RemoveProtectionGroup (ProtectionGroupIdentifier identifier)
This method removes a virtual protection group, unless the group is being replicated during a test failover or an actual failover, and unless the group is being migrated to the peer site. If this method does not return a Success completion code, the ForceRemoveProtectionGroup method may be used to force removal of the group.
StopFailOverTest
public CommandTaskIdentifier StopFailOverTest(ProtectionGroupIdentifier identifier, FailoverTestInfo testInfo)
This method stops a failover test, and removes the test virtual servers from the peer site.
TrimOldFailoverTest
public void TrimOldFailoverTest(ProtectionGroupIdentifier identifier, int numOfOldTestsToTrim)
This method discards information about a specified number of old failover tests for a designated virtual protection group, from the oldest test to the most recent test.
UnprotectVS
public CommandTaskIdentifier UnprotectVS(ProtectionGroupIdentifier identifier, VSIdentifier vsIdentifier)
This method removes a designated virtual server from a designated virtual protection group.
UpdateProtectionGroup
public CommandTaskIdentifier UpdateProtectionGroup (ProtectionGroupIdentifier identifier, ProtectionGroupManagementSettings managementSettings)
This method updates settings of a specified virtual protection group. If the method does not return a Success completion code, the ForceUpdateProtectionGroup method can be used to force the update.
WaitForCheckpoint
public CommandTaskIdentifier WaitForCheckpoint(ProtectionGroupIdentifier identifier, Checkpoint checkpoint, int waitingIntervalInSeconds, int timeoutInSeconds)
This method waits for a checkpoint to be written to a journal on the peer site, after it was inserted, or times out if it takes too long.

APPENDIX IV

Command Tracker Web Services
These web services include methods and properties to monitor procedures being executed.
Properties
CommandTaskInfoProperties
This property includes.
enum CommandType—valid methods;
enum CompletionCode—the result of running a method, including NotAvailable, Success, Aborted, Failed and HadException;
int OriginalInputParms—input parameters; and
int PgId—the globally unique identifier for a virtual protection group.
Methods
GetAllTasks
public List<CommandTaskIdentifier> GetAllTasks( )
This method retrieves a list of all tasks that are currently active.
Get CompletionCode
public CommandTaskCompletionCode GetCompetionCode (CommandTaskIdentifier taskid)
This method returns the completion code of a specified task. Completion codes include Success, Aborted, Failed or HadException. If the task is still running, NotAvailable is returned.
GetCommandTaskInfo
public CommandTaskInfo GetCommandTaskInfo(CommandTaskIdentifier cmdIdentifier)
This method returns the command type, the completion code input parameters, and the virtual protection group identifier of a designated task.
GetExceptionString
public string GetExceptionString(CommandTaskIdentifier taskId)
This method returns the string associated with an exception, for a designated task that had an exception. The method GetCompletionCode returns HadException if a task had an exception.
GetProgress
public int GetProgress (CommandTaskIdentifier taskid)
This method returns progress as a percentage of a whole task, as an integer, for a specified task.
GetProtectionGroupCommandTaskid
public CommandTaskIdentifier GetProtectionGroupCommandTaskId(ProtectionGroupIdentifier pgId)
This method returns the identifier of a task currently being performed on a designated protection group.

GetProtectionGroupCommandTaskidLocally
public CommandTaskIdentifier GetProtectionGroupCommandTaskIdLocally(ProtectionGroupIdentifier) pgId)
This method returns the identifier of a task currently being performed on a specified protection group at a local site.
GetResult
public Object GetResult(CommandTaskIdentifier taskId)
This commend returns the result for a designated task. The returned result may be one of the following:
  the identifier of the virtual protection group identified by the task ID;
  the settings of the virtual protection group identified by the task ID;
  a checkpoint whose insertion is identified by the task ID; or
  the identifier of the log collection identified by the task ID.
GetStatus
public CommandTaskStatus GetStatus(CommandTaskIdentifier taskId)
This method retrieves the current status of a specified task. The status may be Active, Running, Aborted or Completed.
Wait
public void CommandTaskIdentifier Wait(ComamndTaskIdentifier taskId, int IntervalInMillis, int TimeOutInMillis)
This method waits for a specified task to complete, by polling the task at specified time intervals, until a specified time out.

APPENDIX V

Log Collector Web Services
These web services include methods and properties to retrieve information for troubleshooting.
Properties
  LogCollectionRequest
  This property indicates details of a log request, including a level of detail of information, indicating whether information about a virtual data service appliance and core information should be included, and including start and end times for the information.
Methods
  CollectSystemLogs
public CommandTaskIdentifier CollectSystemLogs(LogCollectionRequest request)
  This method initiates a log request.
  RetrieveLogPackage
public Stream RetrieveLogPackage (LogCollectionIdentifier id)
  This method retrieves results of a log request.

What is claimed is:

1. A system for cloud-based data services for multiple enterprises, comprising:
  a first cloud hypervisor that cooperatively provides cloud-based services to multiple enterprises, comprising:
    a first plurality of cloud virtual servers, each of the first plurality of cloud virtual servers associated with a first enterprise;
    a second plurality of cloud virtual servers associated with a second enterprise;
    at least one cloud virtual disk that is read from and written to by at least one of the first plurality of cloud virtual servers, the at least one cloud virtual disk associated with the first enterprise;
    a first cloud virtual data services appliance that provides cloud-based data services to the first enterprise and the second enterprise;
    a first cloud connector of the first enterprise, the first could connector in communication with: at least one of the first plurality of cloud virtual servers, the at least one cloud virtual disk of the first enterprise, the first cloud virtual data services appliance, a data services manager of the first enterprise, and an enterprise virtual data services appliance of the first enterprise;
    a second cloud connector associated with the second enterprise, the second cloud connector in communication with: at least one of the second plurality of cloud virtual servers, at least one cloud virtual disk of the second enterprise, the first cloud virtual services appliance, a data services manager of the second enterprise, and an enterprise virtual data services appliance of the second enterprise;
  a second cloud hypervisor comprising:
    a third plurality of cloud virtual servers, each associated with the second enterprise;
    a second cloud virtual data services appliance that provides cloud-based data services to the second enterprise; and
  a cloud data services manager in communication with: the first cloud virtual data services appliance, the second cloud virtual data services appliance, the first cloud connector, and the second cloud connector.

2. The system of claim 1, wherein the cloud data services manager designates a group of one or more of the cloud virtual servers as a cloud target virtual protection group, and wherein the cloud virtual data services appliance of each cloud hypervisor receives copies of write requests.

3. The system of claim 2, wherein the cloud virtual data services appliance of each cloud hypervisor periodically applies at least some of the copies of the write requests to the at least one cloud virtual disk of the first enterprise or the at least one cloud virtual disk of the second enterprise.

4. The system of claim 2, wherein the cloud target virtual protection group comprises cloud virtual servers from a same one of said cloud hypervisors.

5. The system of claim 2, wherein the cloud target virtual protection group comprises cloud virtual servers from more than one of said cloud hypervisors.

6. The system of claim 2, wherein at least one of said cloud hypervisors comprises at least one cloud virtual server that belongs to the cloud target virtual protection group for the first enterprise, and at least one cloud virtual server that belongs to the cloud target virtual protection group for the second enterprise.

7. The system of claim 2, wherein said cloud data services manager enables data recovery from virtual servers to the cloud target virtual protection group.

8. The system of claim 2, wherein a tapping driver intercepts I/O requests, and wherein the first cloud virtual data services appliance or the second cloud virtual data services appliance receives the intercepted I/O requests from the tapping driver.

9. The system of claim 8 wherein the cloud data services manager enables data recovery from the cloud target virtual protection group to at least one virtual server.

10. The system of claim 1 comprising, for the first enterprise:
  one or more enterprise virtual servers; and
  an enterprise connector that connects the one or more enterprise virtual servers with the first cloud connector.

11. The system of claim 1, wherein at least one of the first cloud connector and the second cloud connector is deployed on a cloud based facility.

12. The system of claim 11, wherein the at least one of the first cloud connector and the second cloud connector is connected to the cloud data services manager executing on the cloud based facility and two or more virtual data services appliances.

13. The system of claim 1, wherein the first cloud connector is deployed on the first enterprise.

14. The system of claim 13, wherein the first cloud connector is connected to an enterprise data services manager and two or more virtual data services appliances.

15. The system of claim 1 wherein the first cloud connector and the second cloud connector encrypt data transmitted between cloud virtual servers and cloud virtual disks.

16. The system of claim 1, wherein the cloud data services manager enables data recovery at multiple points in time.

* * * * *